United States Patent
Yanagida et al.

[11] Patent Number: 5,481,489
[45] Date of Patent: Jan. 2, 1996

[54] METHOD OF AND APPARATUS FOR DISCRIMINATING NAN

[75] Inventors: Masahiro Yanagida; Hiromasa Takahashi, both of Kawasaki; Osamu Tachibana, Matsuyama, all of Japan

[73] Assignee: Fujitsu Limited, Kawasaki, Japan

[21] Appl. No.: 232,001

[22] PCT Filed: Aug. 31, 1993

[86] PCT No.: PCT/JP93/01232

§ 371 Date: Jun. 17, 1994

§ 102(e) Date: Jun. 17, 1994

[87] PCT Pub. No.: WO94/06075

PCT Pub. Date: Mar. 17, 1994

[30] Foreign Application Priority Data

Aug. 31, 1992 [JP] Japan .................................. 4-232061
Sep. 28, 1992 [JP] Japan .................................. 4-257084

[51] Int. Cl.⁶ .................................................. G06F 7/38
[52] U.S. Cl. ...................................... 364/736.5; 364/748
[58] Field of Search .............................. 364/736.5, 745, 364/748

[56] References Cited

U.S. PATENT DOCUMENTS

| | | | |
|---|---|---|---|
| 4,847,802 | 7/1989 | Ashton | 364/736.5 |
| 5,045,993 | 9/1991 | Murakami et al. | 364/200 |
| 5,201,056 | 4/1993 | Daniel et al. | 364/736.5 |
| 5,268,855 | 12/1993 | Mason et al. | 364/748 |

FOREIGN PATENT DOCUMENTS 61-33538  2/1986  Japan.
63-266526 11/1988  Japan.

*Primary Examiner*—David H. Malzahn
*Attorney, Agent, or Firm*—Staas & Halsey

[57] ABSTRACT

When processing a binary floating-point number in the IEEE form, whether or not the data is NaN can be discriminated irrespective of a precision thereof. The binary floating-point number having sign, exponent and fraction parts is based on the IEEE form in which the data is defined as NaN on condition that "all values of respective bits of the exponent part are '1', and all values of respective bits of the fraction part are not '0'". In this binary floating-point number, if a precision of the binary floating-point is the maximum precision, the data is set intactly as internal representation form data. If the precision is less than the maximum precision, the following transform is executed. The sign part is set as it is. The exponent part is extended to a number of bits of the exponent part of the maximum precision, and deficient bits due to this extension are filled with '1'. The fraction part is extended to a number of bits of the maximum precision, and deficient bits due to this extension are filled with '0'. A result of this transform turns out the internal representation form data. With this internal representation form data, a NaN discriminating process is performed en bloc on all the data as maximum precision data.

13 Claims, 33 Drawing Sheets

A DIAGRAM SHOWING A CASE OF TRANSFORMING DATA OF THE MAXIMUM PRECISION INTO THE INTERNAL REPRESENTATION FORM

A DIAGRAM SHOWING A CASE OF TRANSFORMING DATA OF A PRECISION LESS THAN THE MAXIMUM PRECISION INTO THE INTERNAL REPRESENTATION FORM

FIGURE 13 — A DIAGRAM SHOWING A SAVE OF THE NaN FLAGGED DATA

A DIAGRAM SHOWING AN EXAMPLE OF TRANSFORM INTO THE
INTERNAL REPRESENTATION FORM IN A SECOND EMBODIMENT

A DIAGRAM SHOWING A SAVE OF THE NaN FLAGGED DATA IN A THIRD EMBODIMENT

A DIAGRAM SHOWING A RESTORATION OF
THE NaN FLAGGED DATA IN THE THIRD EMBODIMENT

┌─┐
│1│
└─┘
NaN FLAG

FIGURE 31

```
       0                                              63
    ┌───┬──────────────┬──────────────┬──────────────┐
  0 │1│s│111111111111  │x1x ----- x   │0 ------ 0    │ 4 BYTES NaN
    ├───┼──────────────┼──────────────┼──────────────┤
    │0│s│101010101111  │x1x ----- x   │0 ------ 0    │ 4 BYTES
    ├───┼──────────────┼──────────────┴──────────────┤
    │1│s│111111111111  │x1x --------------- x        │ 8 BYTES NaN
    ├───┼──────────────┼─────────────────────────────┤
    │0│s│101010101010  │x1x --------------- x        │ 8 BYTES
    ├───┴──────────────┴─────────────────────────────┤
    │                                                │
    │                     │                          │ — 2 2 1
    │                                                │
    ├───┬──────────────┬──────────────┬──────────────┤
 31 │x│x│x -------- x  │x ----------------- x        │
    └───┴──────────────┴──────────────┴──────────────┘
```

FIGURE 32

```
       0                                              63
    ┌─┬──────────────┬──────────────┬──────────────┐
  0 │s│111111111111  │x1x ----- x   │0 ------ 0    │ 4 BYTES NaN
    ├─┼──────────────┼──────────────┼──────────────┤
    │s│101010101111  │x1x ----- x   │0 ------ 0    │ 4 BYTES
    ├─┼──────────────┼──────────────┴──────────────┤
    │s│111111111111  │x1x --------------- x        │ 8 BYTES NaN
    ├─┼──────────────┼─────────────────────────────┤
    │s│101010101010  │x1x --------------- x        │ 8 BYTES
    ├─┴──────────────┴─────────────────────────────┤
    │                                              │
    │                    │                         │
    │                                              │
    ├─┬──────────────┬─────────────────────────────┤
 31 │x│x -------- x  │x ----------------- x        │
    └─┴──────────────┴─────────────────────────────┘
```

FIGURE 35 DATA FORM TRANSFORM CIRCUIT

A DIAGRAM SHOWING A SINGLE PRECISION FLOATING-POINT NUMBER IN THE IEEE FORM

▲ : DECIMAL POINT

FIGURE 39 A DIAGRAM SHOWING A DOUBLE PRECISION FLOATING-POINT NUMBER IN THE IEEE FORM

▲ : DECIMAL POINT

METHOD OF AND APPARATUS FOR DISCRIMINATING NAN

TECHNICAL FIELD

The present invention relates generally to a floating-point arithmetic employed for processing scientific technology calculations through a data processor and, more particularly, to a technology of discriminating NaN (Not-a-Number) from floating-point numbers. The present invention relates specifically to a method of and an apparatus for discriminating NaN in the binary floating-point numbers based on the IEEE form in which NaN is defined. The present invention relates further to a floating-point register using the NaN discriminating method.

BACKGROUND ART

A scientific technology calculation is one of computer-assisted fields. A floating-point arithmetic is an important function in the scientific technology calculation. One of floating-point number representations in the computer is a representation for binary floating-point numbers according to the IEEE form (a representation for floating-point numbers based on the binary floating-point number representation form established by the IEEE, i.e., Institute of Electrical and Electronic Engineers). "NaN" exclusive of a numeric value is defined in the binary floating-point number based on the IEEE form. NaN is treated differently from the numeric value, and therefore a floating-point number processor requires a detection of NaN.

A floating-point number representation in the IEEE form is a representation based on a bit structure generally having a sign bit, exponent bits and fraction bits. This floating-point number representation is classified into the following forms.

(1) Single Precision Floating-Point Number

A single precision floating-point number in the IEEE form has, as illustrated in FIG. 38, a 1-bit sign part s indicating positive/negative signs, an 8-bit exponent part e indicating a bias exponent in an exponent representation, a 23-bit fraction part f indicating a fraction in the exponent representation and an undefined area. The single precision floating-point number is substantially expressed in 32 bits, i.e., 4 bytes.

In this case, the bit structure goes as follows:

| Sign | s | Positive number when being '0' but negative number when being '1' | |
|---|---|---|---|
| Bias exponent | e | Minimum exponent value | 0 |
| | | Bias exponent | 1–254 |
| | | Maximum exponent value | 255 |
| | | Bias value | 127 |
| Decimal point position | ▲ | | |
| Most significant integer | L | e = 0 | L = 0 |
| | | 0 < e < 255 | L = 1 |
| | | e = 255 | L = 0 |
| Fraction | f | | |

(2) Double Precision Floating-Point Number

A double precision number in the IEEE form has, as shown in FIG. 39, a 1-bit sign part s, a 11-bit exponent part e and a 52-bit fraction part f. The double precision floating-point number is expressed in 64 bits, i.e., 8 bytes.

In this case, a bit structure goes as follows:

| Sign | s | Positive number when being '0' but negative number when being '1' | |
|---|---|---|---|
| Bias exponent | e | Minimum exponent value | 0 |
| | | Bias exponent | 1–2046 |
| | | Maximum exponent value | 2047 |
| | | Bias value | 1023 |
| Decimal point position | ▲ | | |
| Most significant integer | L | e = 0 | L = 0 |
| | | 0 < e < 2047 | L = 1 |
| | | e = 2047 | L = 0 |
| Fraction | f | | |

(3) Extended Double Precision Floating-Point Number

An extended double precision floating-point number in the IEEE form has, as illustrated in FIG. 40, a 1-bit sign part s, a 15-bit exponent part e, a 64-bit fraction part f and an undefined area (48 bits).

In this case, a bit structure goes as follows:

| Sign | s | Positive number when being '0' but negative number when being '1' | |
|---|---|---|---|
| Bias exponent | e | Minimum exponent value | 0 |
| | | Bias exponent | 1–32766 |
| | | Maximum exponent value | 32767 |
| | | Bias value | 16383 |
| Decimal point position | ▲ | | |
| Most significant integer | L | e = 0 | L = 0, 1 |
| | | 0 < e < 32767 | L = 0, 1 |
| | | e = 32767 | L = unsignificant |
| Fraction | f | | |

Supposing that the numeric values are normalized (the most significant bit of the fraction part takes a form of "1"), a value of the floating-point number is expressed in the following representation formula.

$$(-1)^s \times 2^e \times (1.f)$$

By the way, "NAN" is defined in the IEEE form to distinguish normal values from special values as in the case of producing a result when dividing the numeric value by 0 or an overflow. The definition of NaN in the IEEE form is that the exponent part e takes the maximum exponent value, and the fraction part f is not "ALL '0'". In other words, if the exponent part e is "ALL '1'", and if even one bit of '1' is contained in the value of the fraction part f, the data is defined as NaN.

This kind of NaN detection in the floating-point number has hitherto involved the use of methods which follow:

(a) A dedicated NaN detector is provided for every precision (a number of significant digits) in order to perform the NaN detection. When using the data, NaN is detected by a NaN detector corresponding to a precision of the data among a plurality of NaN detectors.

(b) A data representation form to deal with the data in the processor is transformed into a 1-bit extended data form. The NaN detection is effected beforehand when inputting the data to the processor. A result thereof is set as a NaN flag and stored in the 1-bit extended part. A NaN discrimination is conducted based on this NaN flag.

It is, however, required in the method (a) that the NaN detector be prepared for every precision. Further, according to the method (b), when saving/restoring the data in the processor, generally, a memory for saving does not correspond to the data representation form with the extension of the NaN flag bit. No area for storing the NaN flag does not exist on the memory for saving. This conduces to a problem in which the NaN flag is deleted when saved/restored.

DISCLOSURE OF INVENTION

It is an object of the present invention to provide a method of and an apparatus for discriminating NaN, which are capable of surely detecting NaN data without requiring a multiplicity of NaN detectors.

As stated earlier, in the floating-point number taking the IEEE form, NaN is defined on condition that all digits of the exponent part being '1' (that "all digits are '1'" is hereinafter termed "ALL1") is satisfied, and all digits of the fraction part being '0' (that "all digits are '0'" is hereinafter termed "ALL0") is not satisfied. Paying attention to this definition, in the present invention, the binary floating-point number in the IEEE form is transformed into internal representation form data of a maximum precision in a data processor in accordance with the data precision (the number of significant digits) and the NaN discrimination which does not depend on the precision is performed. That is, the data precision is extended to the maximum precision. Extended bits of the exponent part are stored with '1', and extended bits of the fraction part are stored with '0'. It is thus possible to discriminate NaN irrespective of a previous data precision.

The transform into the internal representation form data in the data processor is conducted as follows.

Detected first is a data precision (a number of significant digits) of data of a given floating-point number. This precision is compared with the maximum precision. If the precision is the maximum precision, the transform of the precision does not take place. The given data of the maximum precision intactly become the internal representation form data (see FIG. 8).

If the precision is less than the maximum precision, the following data transform process is carried out (see FIG. 9).

The sign part is stored in an as-is position. The exponent part is extended to the numbers of bits of the maximum precision. At this time, a position of the extended bit part may be set anywhere if it is a univalently fixed bit position. Further, when extended, '1' is stored in all bit positions in which significant bits corresponding to that position do not exist (namely, there is no previous data to be stored). The fraction part is also extended to a number of bits of a fraction part of the maximum precision. In this case also, the position of the extended bit part may be set anywhere if it is a univalently fixed bit position. Besides, when extended, '0' is stored all the bit positions in which the significant bits corresponding to that position doe not exist (there is no previous data to be stored).

In the NaN discrimination, if the exponent part e of the internal representation form data is ALL1 (All digits are '1'), and the fraction part of the data is not ALL0 (All digits are '0'), the data is discriminated as NaN (see FIG. 10).

The apparatus for discriminating NaN according to the present invention comprises a precision detecting section, a maximum precision discriminating section and a transform section. The precision detecting section detects a precision of a floating-point number including a sign part, an exponent part and a fraction part, which is expressed in a predetermined form. The maximum precision discriminating section discriminates whether the precision detected is the maximum precision or not. The transform section transforms the floating-point number into the internal representation form data in the data processor.

The transform section, when the maximum precision discriminating section discriminates that the precision is the maximum precision, sets the data of the floating-point number intactly as the internal representation form data. The transform section, when the maximum precision discriminating section discriminates that the precision does not meet the maximum precision, causes the transformation on the floating-point number as follows. The sign part of the floating-point number is stored in the as-is position. The exponent part of the floating-point number is extended to the maximum precision, and an extended bit area is filled with '1'. The fraction part of the floating-point number is also extended to the maximum precision, and an extended bit area is filled with '0'.

The NaN discriminating section if the data processor discriminates the data as NaN if the exponent part of the internal representation form data is ALL1, and the exponent part is not ALL0.

In the system according to the present invention, the precision is extended by executing the above processes, thereby making the NaN discrimination. Hence, when employed for processing the data after the NaN discrimination, it is required in some cases that the internal representation form data be inverse-transformed into the floating-point number of the previous precision.

For this purpose, an inverse transform section for returning the internal representation form to the previous one may be provided in the present invention. This inverse transform section, on the basis of the internal representation form data, sets the sign part as it is, sets the exponent part back to the previous precision by eliminating the extended bit part, and also sets the fraction part back to the previous precision by eliminating the extended bit part. The inverse transform section combines these parts and thus returns the floating-point number in the above internal representation form to the floating-point number of the previous precision (see FIG. 11).

Next, when the data transformed into the internal representation form of the maximum precision by the above method is discriminated as NaN, it is also possible to provide a NaN flag setting section for setting a NaN flag to the above internal representation form data (see FIG. 12).

After forming such flagged data, NaN can be detected by detecting the flag.

For instance, if an interrupt process arises, it is required that the flagged data be saved in a memory. A problem does not particularly arise if the memory has an area enough to store the flag. No such area does not, however, exist on a typical memory. In such a case, when saving the NaN flagged data, the NaN flag is excluded, and only the data part of the NaN flagged data is saved (see FIG. 13).

In the case of restoring the data after finishing the interrupt process, to begin with, the saved data is restored. The above-mentioned NaN discriminating section performs a NaN discrimination with respect to the restored data. As a result of the discrimination, if the restored data is NaN, the NaN flag is restored and set to the above restored data. The NaN discrimination of the NaN flagged data is conducted based on the NaN flag.

The NaN discrimination according to the present invention is performed in the following manner.

On the occasion of the discrimination, first, the data precision is extended to the maximum precision. Deficient bits of the exponent part when extended are stored with '1'. Accordingly, if the exponent before being extended is not ALL1, the exponent after being extended is not either. If the exponent before the extension is ALL1, the exponent after the extension is also ALL1. Deficient bits of the fraction part when extended are stored with '0'. Hence, if the fraction before the extension is not ALL0, the fraction after the extension is not either. Further, if the fraction before the extension is ALL0, the fraction after the extension is also ALL0.

In the floating-point number in the IEEE form, the NaN definition is given on condition that the exponent part is ALL1, and the fraction part is not ALL0. It is therefore possible to perform the NaN discrimination by knowing whether the exponent part is ALL1 or not and the fraction part is ALL0 or not. Consequently, the NaN discrimination can be made by use of the internal representation form data in the present invention without depending on the previous data precision.

Moreover, when forming the NaN flagged data by combining the result of this transform with the result of the NaN discrimination, the NaN discrimination can be implemented simply by discriminating the flag. Besides, if the internal data are saved by temporarily suspending the floating-point processing due to a factor such as an interrupt, etc., the operation may be performed as below.

In the case of saving the NaN flagged data to the outside of the processor, normally, not the NaN flag part but the data part alone is saved. It is because the location for saving the data is normally a memory having no area for storing the NaN flag.

When restoring such saved data to the NaN flagged data, the data part of the saved data is intactly restored to the data part of the NaN flagged data (see FIG. 14). At this time, whether or not the data to be restored is NaN is discriminated from values of the exponent and fraction parts. The NaN flag is restored in accordance with the result thereof. The method of effecting the NaN discrimination with the extension to the maximum precision according to the present invention is capable of discriminating NaN without depending on the data precision. Hence, the NaN flag with respect to the data to be restored can be restored without depending on the precision of the saved data.

BRIEF DESCRIPTION OF DRAWINGS

FIG. 23 is an explanatory diagram of a data structure, showing operation of the floating-point registers of FIGS. 21 and 22;

FIG. 24 is an explanatory diagram of the data structure, showing the operation of the floating-point registers of FIGS. 21 and 22;

FIG. 25 is an explanatory diagram of the data structure, showing the operation of the floating-point registers of FIGS. 21 and 22;

FIG. 26 is an explanatory diagram of the data structure, showing operation of the floating-point registers of FIGS. 21 and 22;

FIG. 31 is an explanatory diagram of the data structure, showing the operation of the floating-point registers of FIGS. 21 and 22;

FIG. 32 is an explanatory diagram of the data structure, showing operation of the floating-point registers of FIGS. 21 and 22;

BEST MODE FOR CARRYING OUT THE INVENTION

[Embodiment 1]

Figure 1:
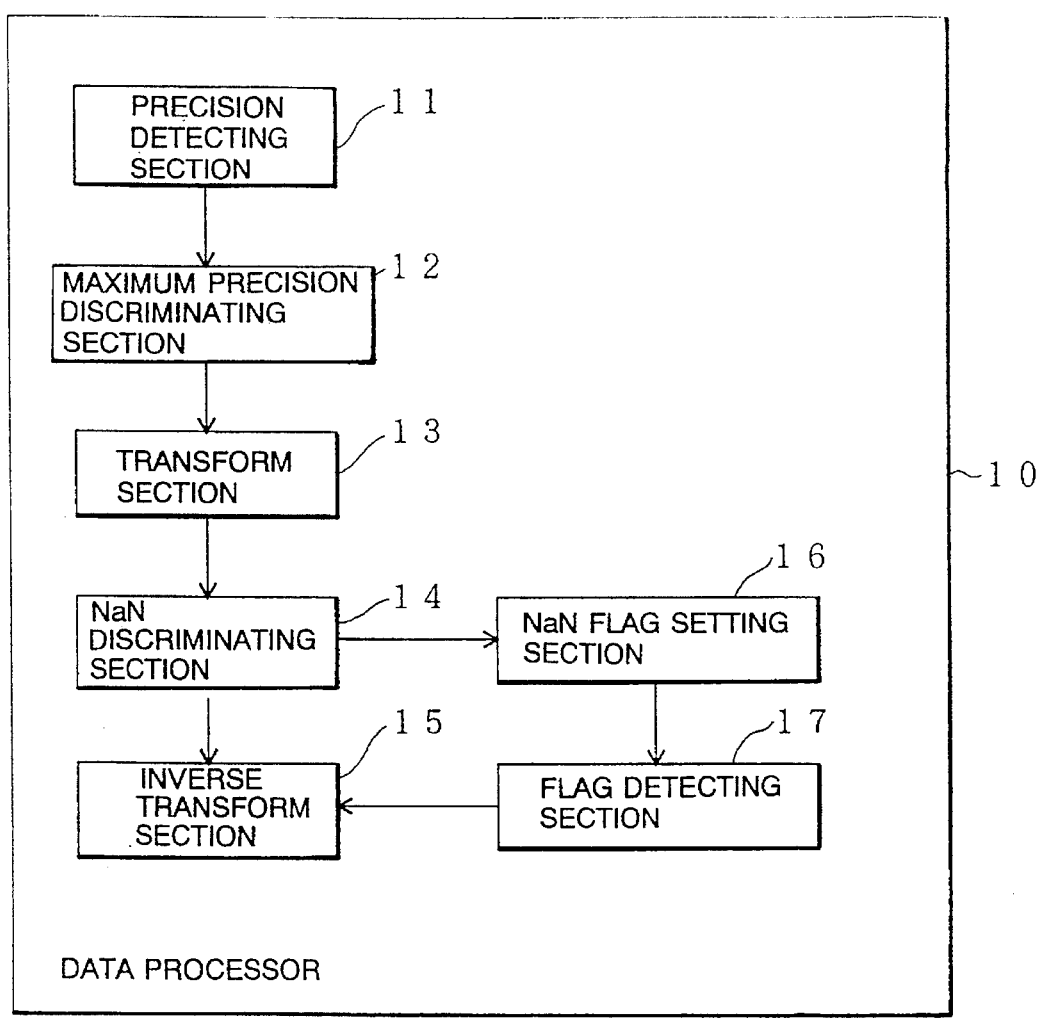
FIG. 1 is a block diagram showing a construction of a first embodiment in principle of a NaN discriminating system according to the present invention.

FIG. 1 illustrates a construction of a first embodiment in terms of principle of a NaN discriminating system according to the present invention.

The NaN discriminating system of FIG. 1 comprises a precision detecting section 11, a maximum precision discriminating section 12, a transform section 13, a NaN discriminating section 14, an inverse transform section 15, a NaN flag setting section 16 and a flag detecting section 17. This system is incorporated into a data processor 10.

The precision detecting section 11 detects a precision of a floating-point number including a sign part, an exponent part and a fraction part. The maximum precision discriminating section 12 discriminates whether the precision detected by the precision detecting section 11 is the maximum precision or not. The transform section 13 transforms the floating-point number into data according to an internal representation form in the data processor 10 on the basis of a discriminated result of the maximum precision discriminating section 12.

The transform section 13, when the maximum precision discriminating section 12 discriminates that "Precision= Maximum Precision", sets the floating-point number data intactly as data taking the internal representation form. Further, the transform section 13, when the maximum precision discriminating section 12 discriminates that "Precision<Maximum Precision", causes the following operation. The sign part of the floating-point number is stored in an as-is position. The exponent part of the floating-point number is extended to the maximum precision, and '1' is stored in each bit of an extended part. At the same time, the fraction part of the floating-point number is also extended to the maximum precision, and '0' is stored in each bit of the extended part.

The NaN discriminating section 14, when the exponent part of the data in the internal representation form is ALL1 (All digits are '1') but the fraction part is not ALL0 (All digits are '0'), discriminates that the data thereof is NaN.

In the system according to the present invention, NaN of the data is discriminated by extending the precision to the maximum precision by the above processing. For this reason, if the data is used for data processing after discriminating NaN, it is required that the data in the internal representation form be inverse-transformed into the floating-point number of the previous precision.

Figure 11:
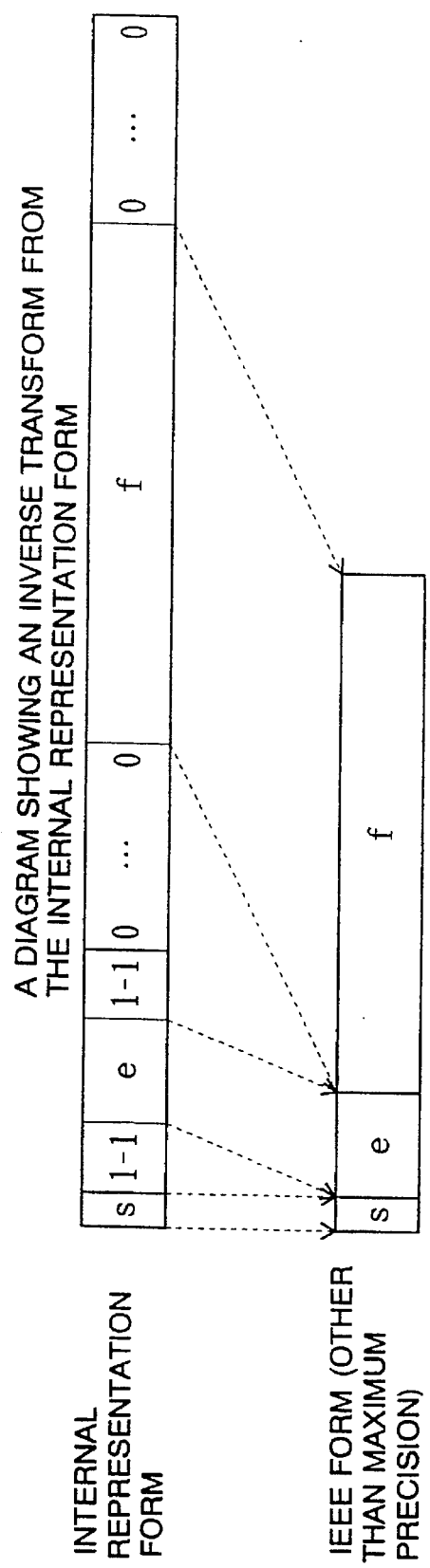
FIG. 11 is an explanatory diagram of an inverse transform from the internal representation form into the previous IEEE form in the system of FIG. 2.

Then, the system in this embodiment is provided with the inverse transform section 15 for returning the data from the internal representation form to the previous form. This inverse transform section 15, from the internal representation form with the extension to the maximum precision as illustrated in FIG. 11, sets the sign part as it is but sets both the exponent part and the fraction part back to the previous precision exclusive of the extension bits. The inverse transform section 15 combines and returns these parts to the floating-point number of the previous precision.

Figure 12:
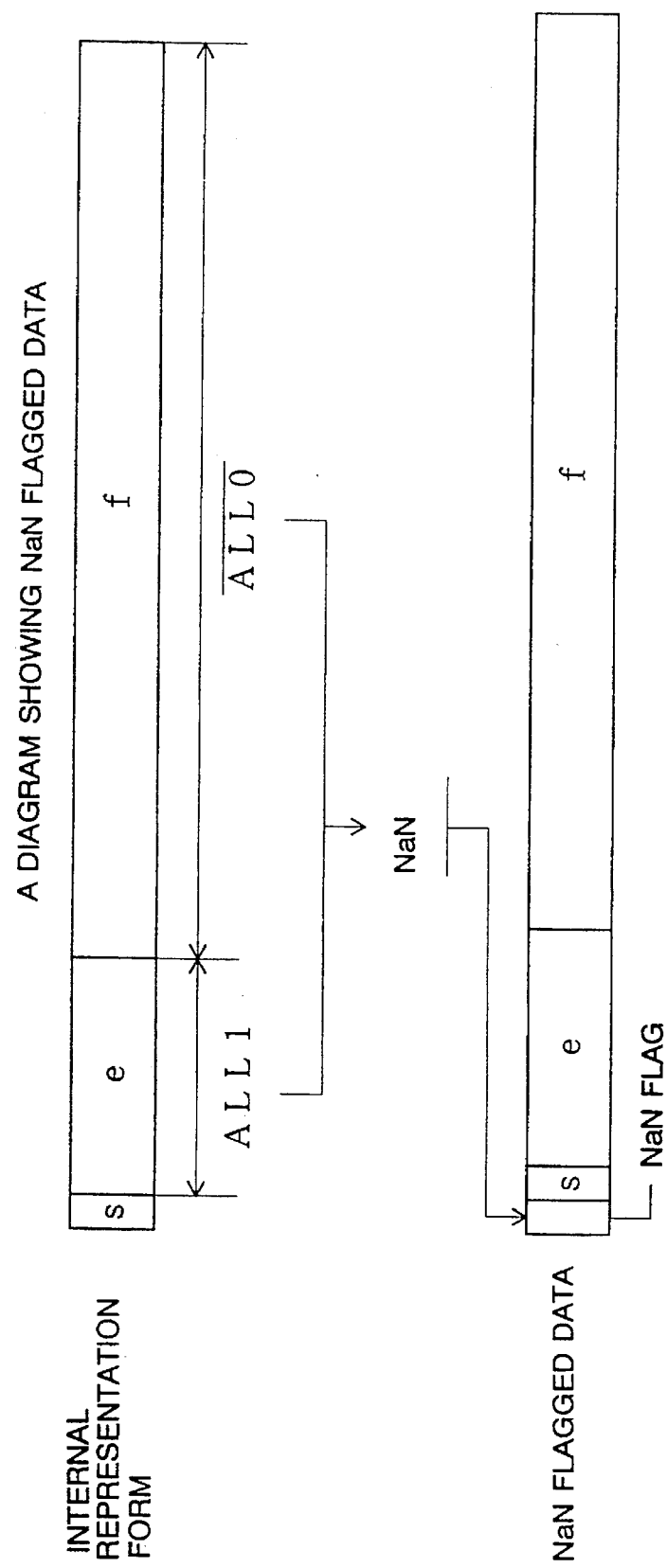
FIG. 12 is an explanatory diagram of a transform from the internal representation form into NaN flagged data in the system of FIG. 2.

Provided is the NaN flag setting section 16 for setting the NaN flag to the data in the internal representation form when the NaN discriminating section 14 discriminates that the data is NaN after the transform into the data based on the internal representation form of the maximum precision as explained earlier. This NaN flag setting section 16 forms, as illustrated in FIG. 12, NaN flagged data.

When forming such flagged data, the flag detecting section 17 thereafter is capable of simply performing the NaN detection.

Figure 13:
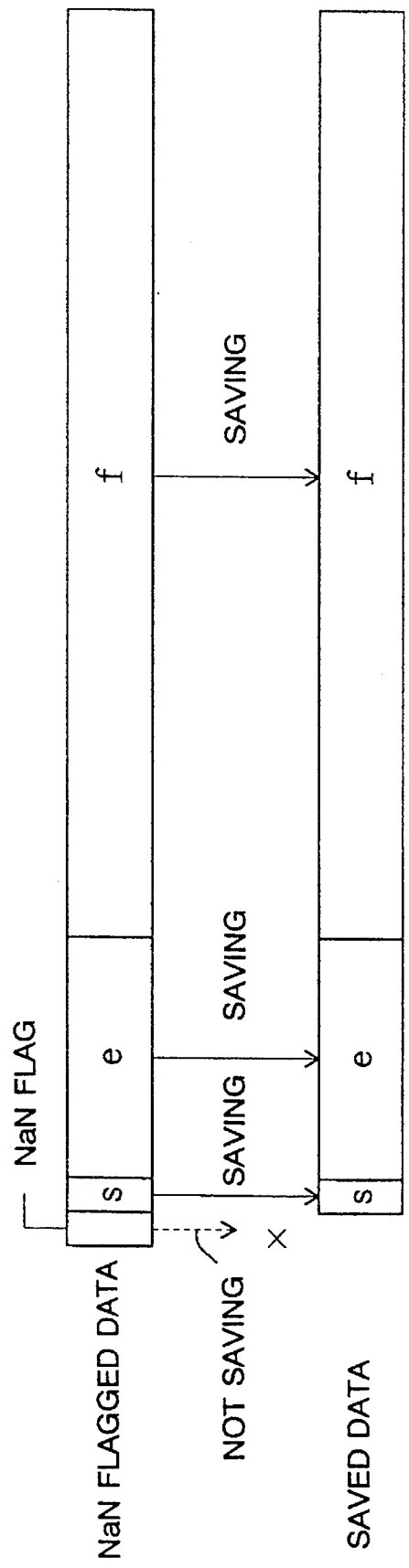
FIG. 13 is an explanatory diagram of saving of the NaN flagged data in the system of FIG. 2.
Figure 14:
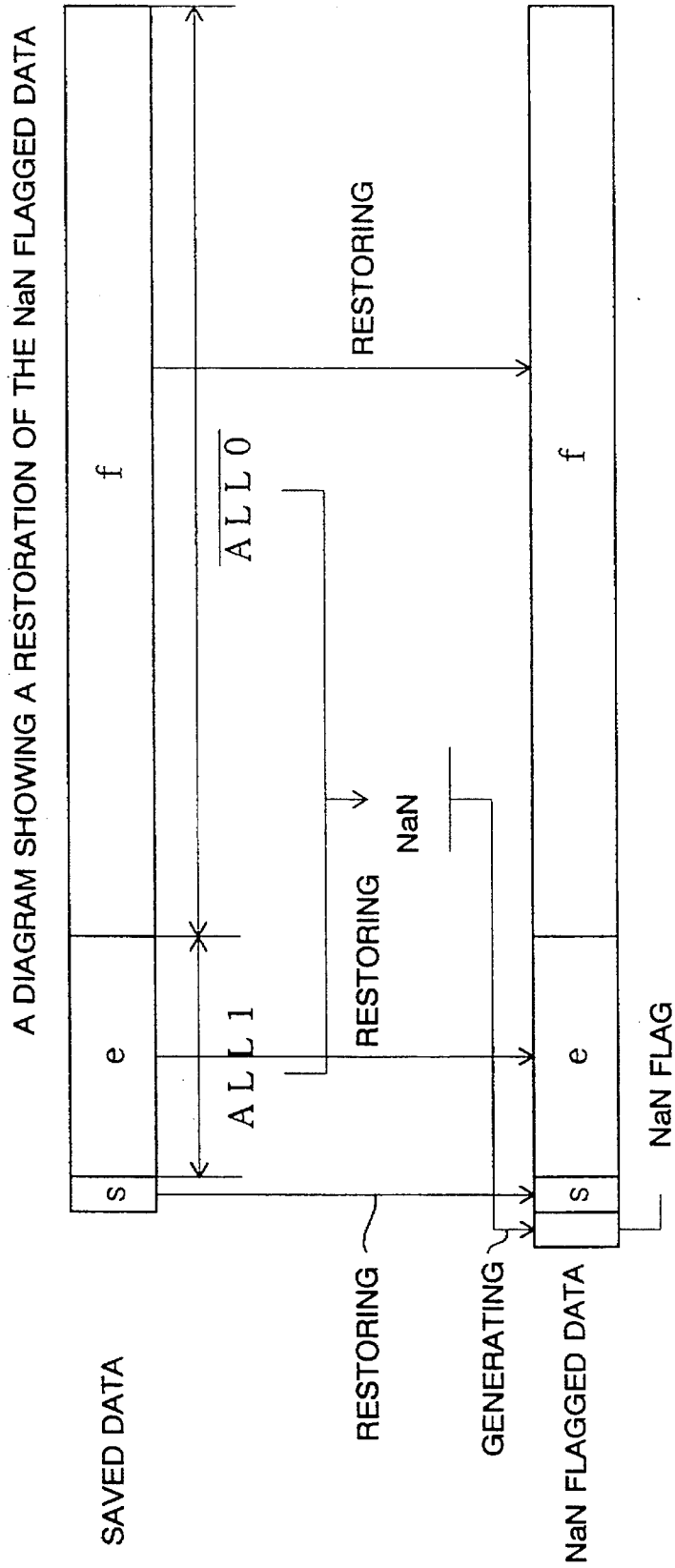
FIG. 14 is an explanatory diagram of restoring of the NaN flagged data in the system of FIG. 2.

Next, if, e.g., an interrupt process arises, it is required that the above flagged data be saved in a memory. In this case, if the memory is prepared with an area for storing the flag, there is no problem. However, an ordinary memory has no such area. Then, when saving the NaN flagged data, as illustrated in FIG. 13, the flag is eliminated, and only the data part of the NaN flagged data is saved.

With an end of the interrupt process, the data are restored. In this case, to start with, the saved data themselves are restored. The NaN discriminating section 14 performs a NaN discrimination with respect to the restored data. In the case of discriminating that the restored data are NaN, the NaN flags are regenerated and set to the restored data. The NaN flagged data are thus restored. The NaN discrimination of the NaN flagged data is done with the NaN flags at all times.

In the present system, the data representation precision is temporarily extended to the maximum precision. When extended, deficient bits of the exponent part filled with '1'. Hence, if the exponent part before the extension is not ALL1, the exponent part after the extension is not either. If the exponent part before the extension is ALL1, the exponent part after the extension is also ALL1. Similarly, when extended, the deficient bits of the fraction part are filled with '0'. Accordingly, if the fraction part before the extension is not ALL0, the fraction part after the extension is not either. Further, if the fraction part before the extension is ALL0, the fraction part after the extension is also ALL0.

In the floating-point numbers based on the IEEE form, NaN is defined on condition that the exponent part is ALL1, but the fraction part is not ALL0. If ALL1 and ALL0 of the exponent part are known, the NaN discrimination can be performed. According to the present system, the floating-point number data in the IEEE form are transformed into the internal representation form of the maximum precision while keeping the NaN conditions, and the NaN discrimination is carried out. It is therefore possible to discriminate NaN without depending on the precision.

Moreover, the NaN flagged data are formed by combining a result of the transform into the maximum precision with a result of the NaN discrimination. With this processing, it is feasible to discriminate not only an existence or non-existence of the flags but also NaN in a simple manner.

[Embodiment 2]

Figure 2:
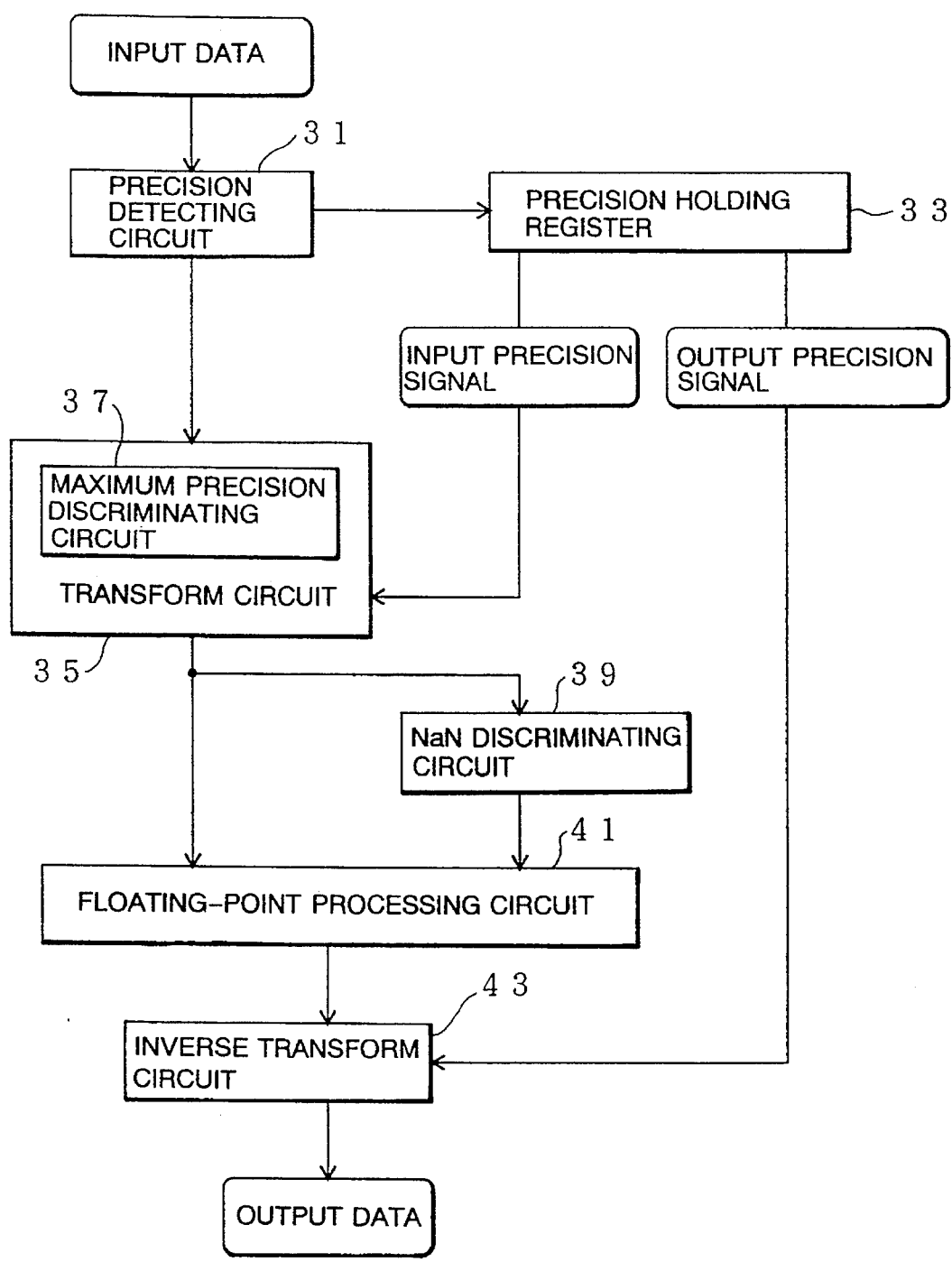
FIG. 2 is a block diagram illustrating a construction of a second embodiment of the NaN discriminating system of the present invention.

FIG. 2 illustrates a specific construction of a second embodiment of the NaN discriminating system according to the present invention.

The NaN discriminating system of FIG. 2 comprises a precision detecting circuit 31, a precision holding register 33, a transform circuit 35, a maximum precision discriminating circuit 37, a NaN discriminating circuit 39, a floating-point number processing circuit 41 and an inverse transform circuit 43.

As illustrated in FIG. 2, the precision detecting circuit 31 detects a precision of the floating-point number of inputted data. The inputted data precision detected by this precision detecting circuit 31 is held by the register 33.

A precision signal held by the register 33 is supplied as an input precision signal to the transform circuit 35. The transform circuit 35 includes the maximum precision discriminating circuit 37 for discriminating whether or not the supplied precision signal indicates the maximum precision. Based on a result of the discrimination by this maximum precision discriminating circuit 37, the floating-point number is transformed into data in the internal representation form of the data processor including this system.

When the maximum precision discriminating circuit 37 discriminates that "Precision=Maximum Precision", the transform circuit 35 sets the floating-point number data intactly as the data in the internal representation form.

Further, when the maximum precision discriminating circuit 37 discriminates that "Precision<Maximum Precision", the transform circuit 34 performs the following process.

The transform circuit 35 causes the sign part of the floating-point number to be stored in the as-is position. Simultaneously, the transform circuit 35 extends the exponent part to the maximum precision and stores each bit of the extended part with '1'. The transform circuit 35 also extends the fraction part to the maximum precision and stores each bit of the extended part with '0'.

In this manner, the floating-point numbers of any precision are transformed into the data in the internal representation form which finally has the maximum precision.

Connected to the transform circuit 35 are both of the NaN discriminating circuit 39 and the floating-point number processing circuit 41.

Figure 3:
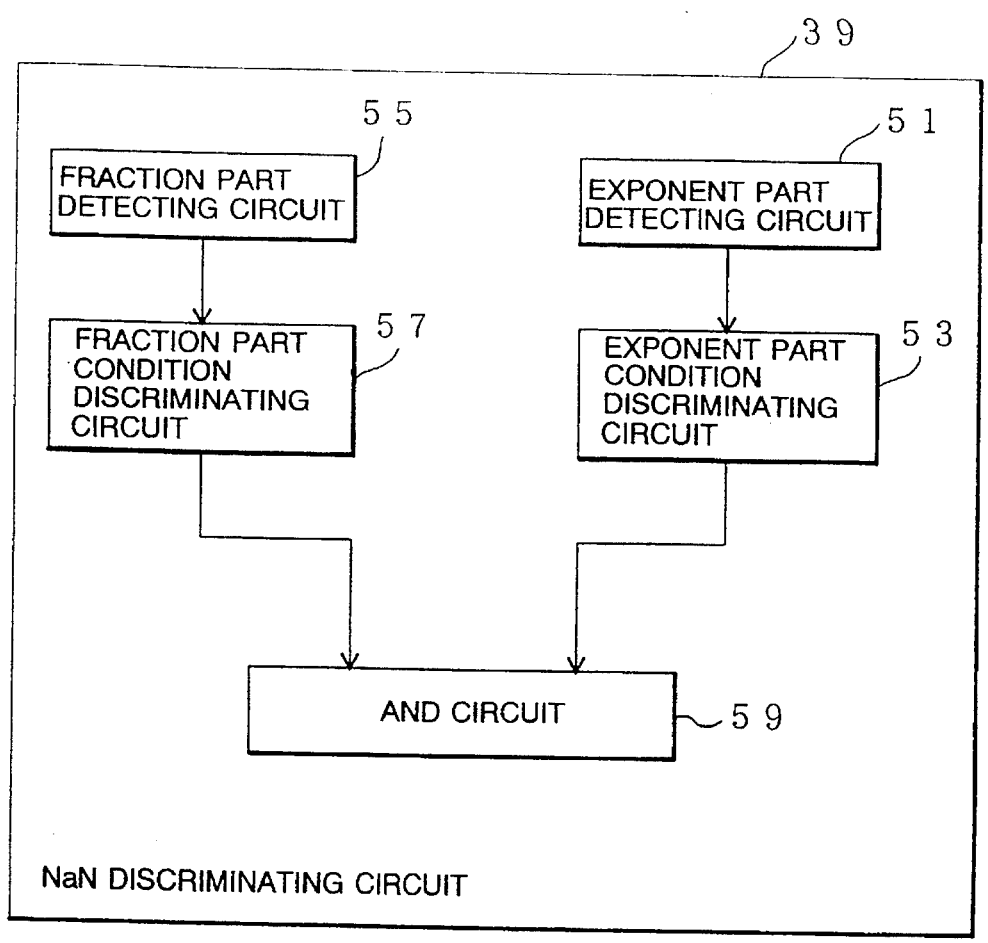
FIG. 3 is a block diagram illustrating a configuration of a NaN discriminating circuit in the system of FIG. 2.

The NaN discriminating circuit 39 includes, as illustrated in FIG. 3, an exponent part detecting circuit 51, an exponent part condition discriminating circuit 53, an exponent part detecting circuit 55, an exponent part condition discriminating circuit 57 and an AND circuit 59.

The exponent part detecting circuit 51 detects a value of each bit of the exponent part of the transformed internal representation form data. The exponent part condition discriminating circuit 53 discriminates whether or not all the values of respective bits of the exponent part are '1', the values being detected by the exponent part detecting circuit 51. The exponent part detecting circuit 55 detects a value of each bit of the exponent part of the extension-transformed internal representation form data. The exponent part condition discriminating circuit 57 discriminates whether or not all the values of respective bits of the exponent part are '0', the values being detected by the exponent part detecting circuit 55. The AND circuit 59 discriminates that the floating-point number data are NaN. This discrimination is made based on such AND conditions that the exponent part condition discriminating circuit 53 discriminates that the exponent part is ALL1 (All digits are '1'), and the exponent part discriminating circuit 57 discriminates that the exponent is not ALL0 (All digits are '0').

If the exponent part of the internal representation form data is ALL1, and the fraction part is not ALL0, the above NaN discriminating circuit 39 discriminates that the data is NaN.

The floating-point number processing circuit 41 processes the floating-point number in accordance with a result of discrimination by the NaN discriminating circuit 39.

The floating-point number processing circuit 41 performs processes inclusive of an arithmetic process such as, e.g., scientific technology calculations by use of the extended internal representation form data. An output of the floating-point number processing circuit 41 is transformed into the previous data form by the inverse transform circuit 43 and then outputted.

More specifically, the floating-point number processing circuit 41 performs the processes by employing the internal representation form data. If, e.g., an interrupt takes place during the process by the floating-point number processing circuit 41, the in-process data are required to be saved, The data saved when the interrupt is caused are internal data of the floating-point number processing circuit 41 as well as being the internal representation form data. The internal representation form data are inverse-transformed by the inverse transform circuit 43 after finishing all the processes in the floating-point number processing circuit 41.

The inverse transform circuit 43 takes in precision data of the floating-point number in the previous form as an output precision signal from the register 33. The inverse transform circuit 43 inverse-transforms the internal representation form data into a previous floating-point number with reference to this precision data.

A difference between the number of bits of the previous precision data and the number of bits of the maximum precision data that are held in the register 33 corresponds to the number of bits for the extension. The inverse transform circuit 43 returns the internal representation form data extended to the maximum precision to the floating-point number of the previous precision. The following is the way how the internal representation form data with the maximum precision is returned to the floating-point number of the previous precision.

To be specific, the sign part of the internal representation form data becomes an as-is sign part of the inverse transform data. The exponent part of the internal representation form data, after being transformed into the previous precision exclusive of an extended '1' bit part, becomes an exponent part of the inverse transform data. The exponent part of the internal representation form data, after being transformed into the previous precision exclusive of an extended '0' bit part, also becomes an exponent part of the inverse transform data. These sign, exponent and fraction parts are combined to obtain the inverse transform data. The inverse transform data are defined as floating-point numbers of the previous precision.

Herein, some consideration will be given to a case where the precision of the floating-point number in the IEEE form involves the use of a 4-byte precision for expressing a floating-point number in 4 bytes and an 8-byte precision for expressing the data in 8 bytes (a single precision is based on 4 bytes, and therefore, a double precision is based on 8 bytes). The maximum precision in this case is a precision of 8 bytes (i.e., 64 bits).

Figure 4:
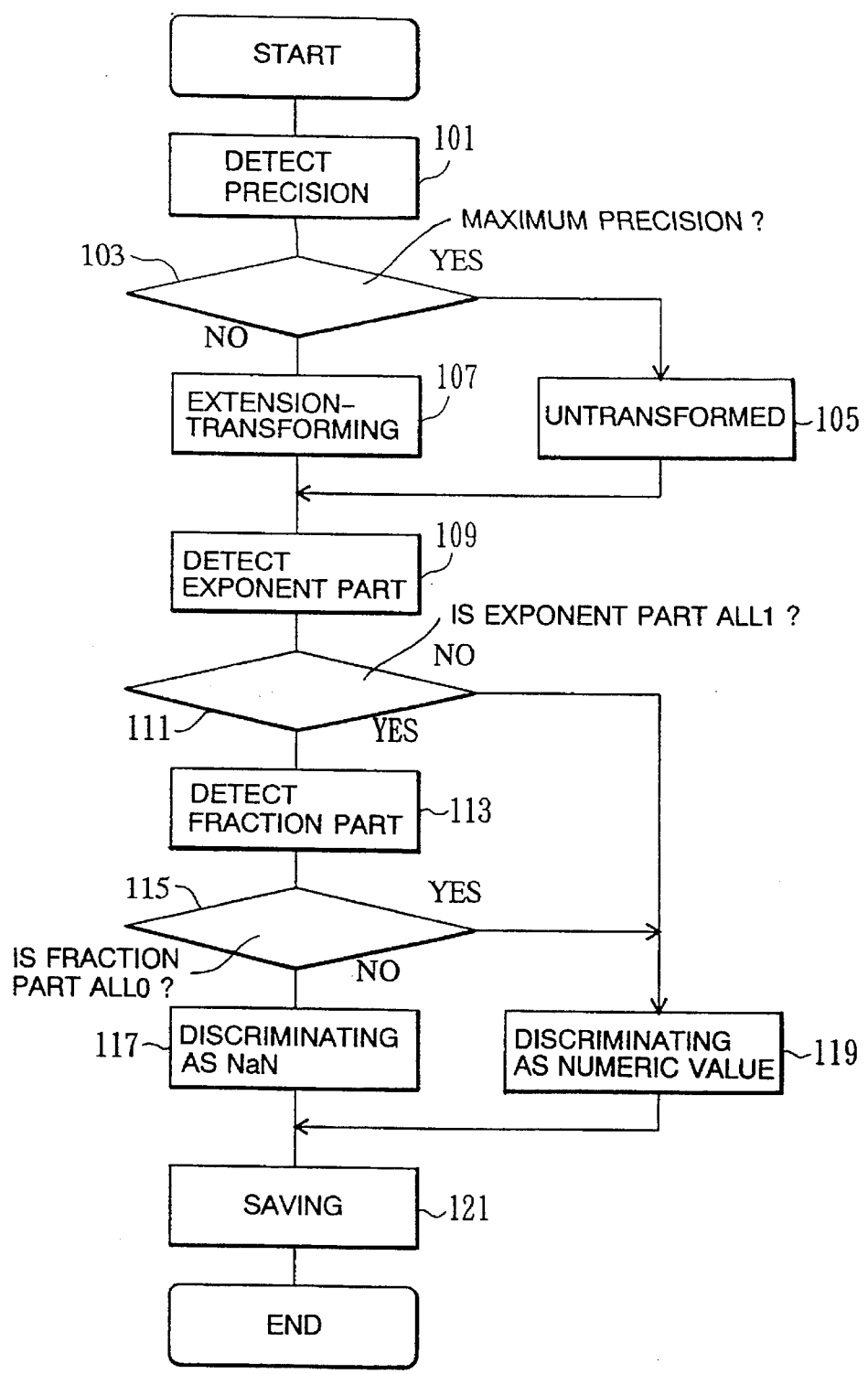
FIG. 4 is an explanatory flowchart showing operation of a NaN discrimination in the system of FIG. 2.

To begin with, a flow of processing when saving the data will be explained with reference to FIG. 4. First, the precision detecting circuit 31 detects a precision of the floating-point number (step 101). The precision detecting circuit 31 detects an 8-byte precision or a 4-byte precision from the number of bytes (the number of bits) of input data. This detected result is stored in the precision holding register 33 and, at the same time, inputted as an input precision signal to the maximum precision discriminating circuit 37 in the transform circuit 35. The maximum precision discriminating circuit 37 discriminates whether or not the given precision is the 8-byte precision defined as the maximum precision (step 103). Precision data obtained from the detection by the precision detecting circuit 31 may be the number of bits itself of the input data.

Eight-byte data is, because of being the maximum precision, transformed intactly into the internal representation form data (step 105).

Figure 15:
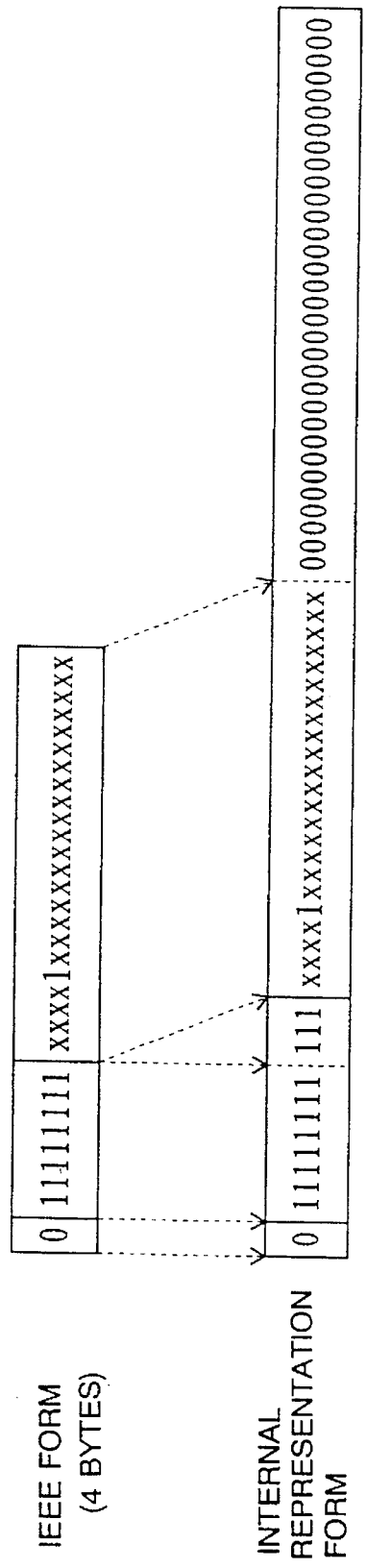
FIG. 15 is a diagram showing an example of transforming the IEEE form data into the internal representation form data in the system of FIG. 2.

Four-byte data is transformed in the following manner for an extension of the data form (step 107). The sign part is set intactly to the sign part of the internal representation form data (obtained by the transform). The exponent part is extended to 11 bits conceived as a number of bits of the exponent part of the 8-byte data. That is, the exponent part of the 4-byte data consists of 8 bits and is therefore extended for 3 bits. The fraction part is also extended to 52 bits conceived as a number of bits of the fraction part of the 8-byte data. To be more specific, the fraction part of the 4-byte data consists of 23 bits and is therefore extended for 29 bits. FIG. 15 shows one example of a transform in this data form. In this case, as illustrated in FIG. 15, the extended bits of the exponent and fraction parts are each added to a low-order part (to the right hand).

The internal representation form data thus extended to the maximum precision are used directly for the NaN discrimination (steps 109–119) in the data processing. Alternatively, the extended internal representation form data are read according to the necessity after being temporarily saved and may be employed for the NaN discrimination.

The data processing uses the data after the NaN discriminating circuit 39 has performed the NaN discrimination. However, a discriminating method goes as follows.

Figure 16:
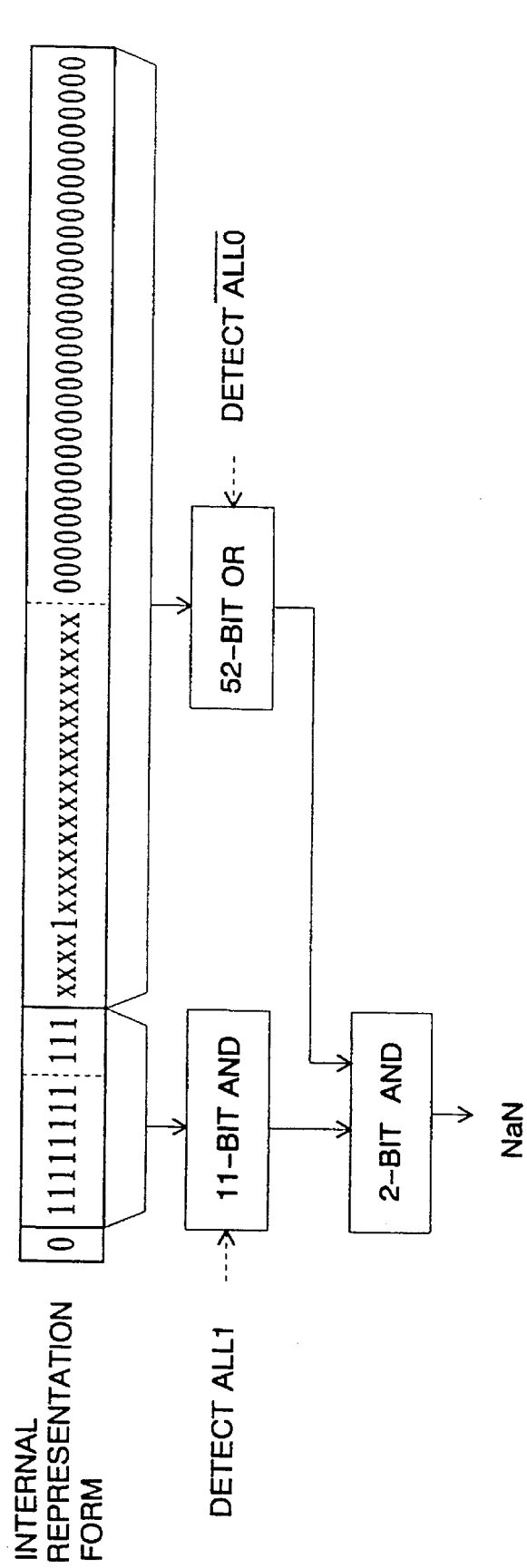
FIG. 16 is a diagram of a specific example of the internal representation form, showing NaN discriminating conditions in the system of FIG. 2.

It is required for discriminating NaN to detect ALL1 of the exponent part and ALL0 of the fraction part of the internal representation form data. At the first onset, the exponent part detecting circuit 51 detects a value of each bit of the exponent part of the internal representation form data (step 109). Then, the exponent part condition discriminating circuit 53 ANDs the values of respective bits of the exponent part, i.e., all the bits of bit numbers 1–11 of the internal form data, thereby detecting that the exponent part is ALL1 (step 111). The fraction part detecting circuit 55, after detecting that the exponent part is ALL1, detects the values of respective bits of the fraction part of the internal representation form data (step 113). This detection of the fraction part may be performed not on the condition that the exponent part is ALL1 but simultaneously with the detection of the exponent part. Then, the fraction part condition discriminating circuit 57 ORs the values of respective bits f the fraction part, i.e., bit numbers 12–63 of the internal form data, thereby detecting that the fraction part is not ALL0 (step 105). Subsequently, the AND circuit 59 implements the AND operation on the fact that the exponent part is ALL1 and that the fraction part is not ALL0. If the exponent part is ALL1, and the fraction part is not ALL0, the data is discriminated as NaN (steps 117 and 119). This operation is shown in FIG. 16.

In this way, the NaN discriminating circuit 39 detects the statuses of the exponent and fraction parts of the internal representation form data. As a result, when the exponent part is ALL1, and the fraction part is not ALL0, the NaN discriminating circuit 39 discriminates the data as NaN.

The floating-point number processing circuit 41 performs a predetermined process, e.g., saves the floating-point number in accordance with a result of discrimination made by the NaN discriminating circuit (step 121).

Figure 6:
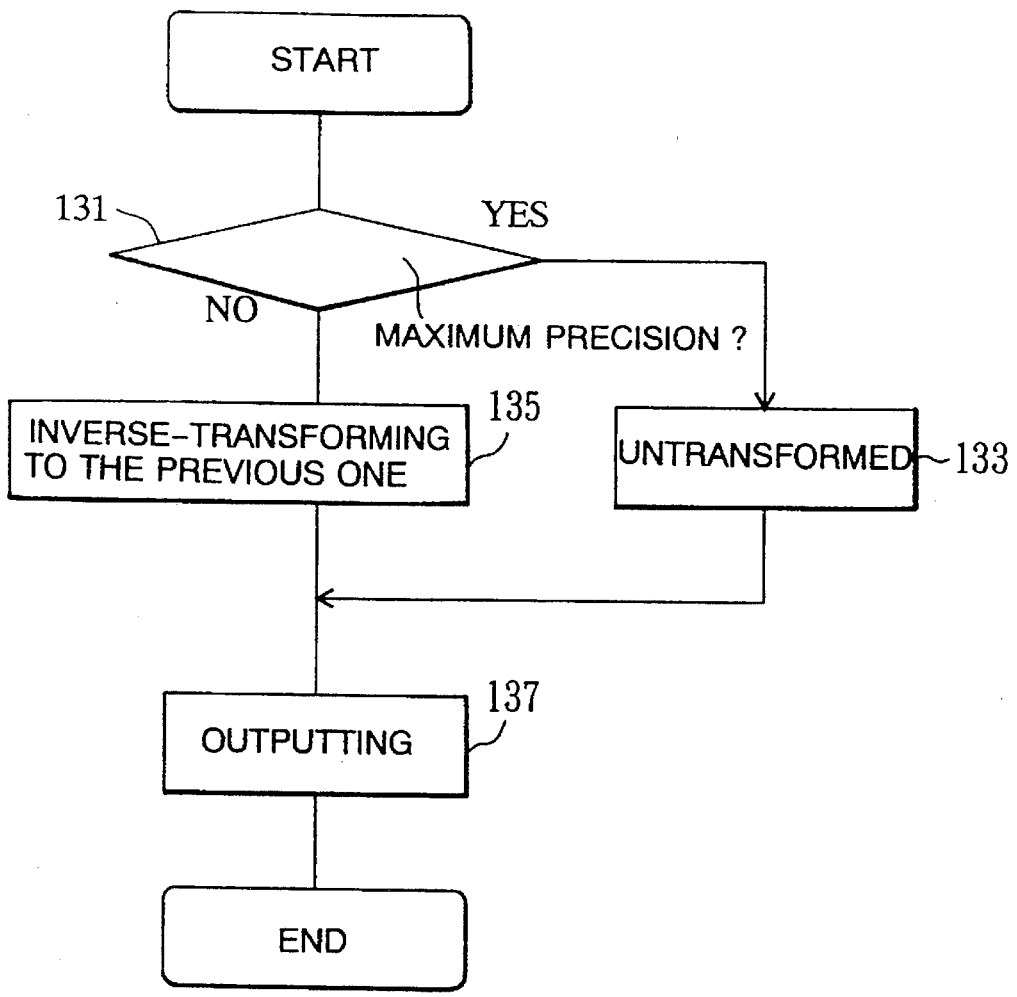
FIG. 6 is an explanatory flowchart showing processing operation of outputting the data with an inverse transform of the data in the system of FIG. 2.

Next, a flow of processing when outputting the data will be explained with reference to FIG. 6.

An output from the floating-point number processing circuit 41 is inverse-transformed into the previous form by the inverse transform circuit 43. This inverse transform circuit 43 takes in, as an output precision signal, the precision data of the of the floating-point number in the previous form from the precision holding register 33. The inverse transform circuit 43 discriminated whether or not the precision is the maximum precision with reference to this precision data (step 131).

The 8-byte data is discriminated as the maximum precision and hence outputted in the as-is form (step 133) without transforming the representation form (step 137).

The 4-byte data is inverse-transformed in the following manner (step 135). That is, there is taken a difference in the number of bits between the previous precision and the maximum precision which are held by the precision holding register 33. A number of bits for the above extension is thereby obtained.

From the internal representation form extended to the maximum precision, the sign part is set as it is. The exponent part is set to the previous precision by eliminating the extended bit part stored with '1'. The fraction part is also set to the previous precision by eliminating the extended bit part stored with '0'. These parts are combined to return the data to floating-point number of the previous precision.

[Embodiment 3]

Figure 19:
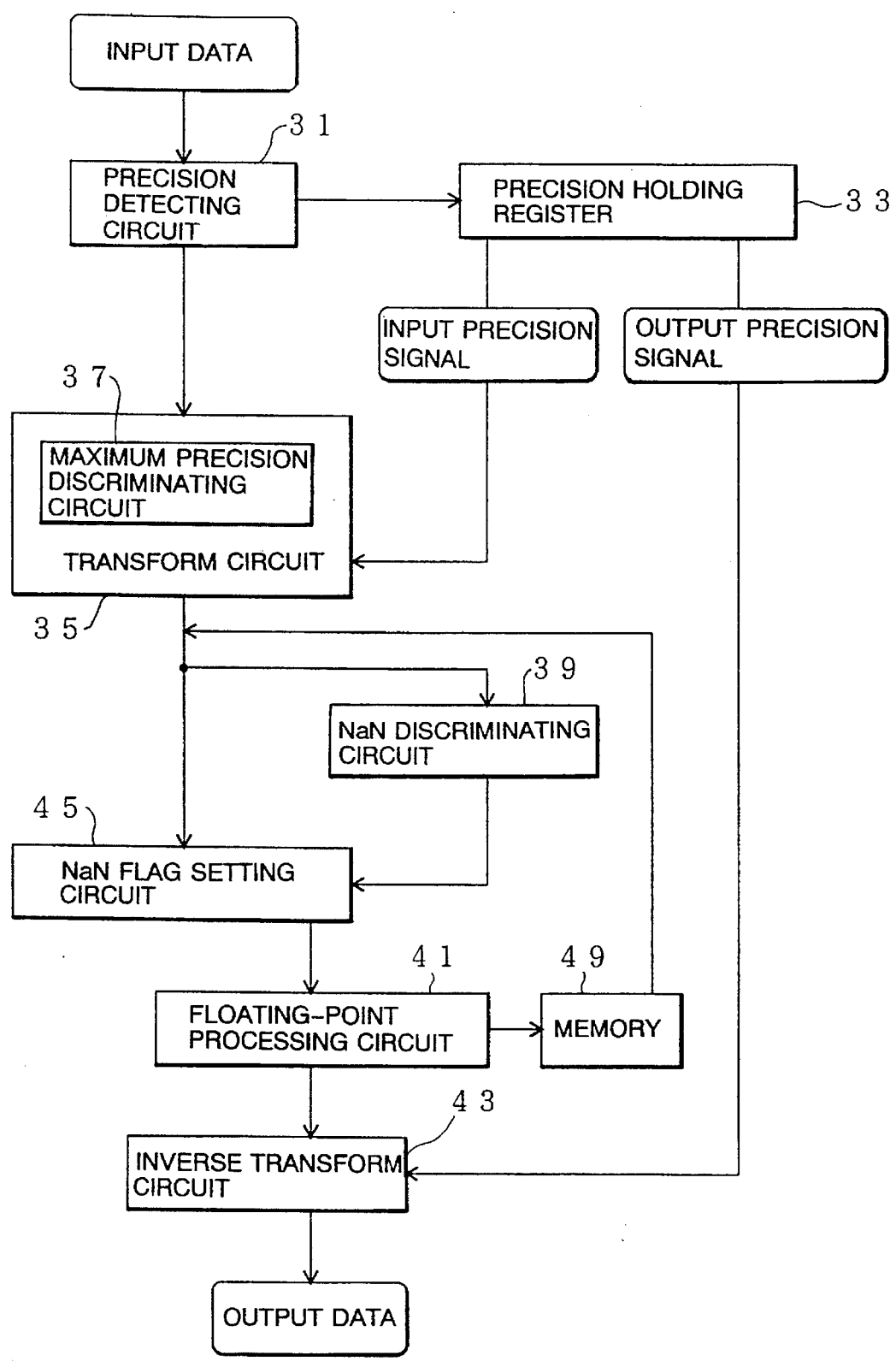
FIG. 19 is a block diagram showing a construction of a third embodiment of the NaN discriminating system of the present invention.

FIG. 19 illustrates a specific construction of a third embodiment of the NaN discriminating system according to the present invention.

This third embodiment gives a case where a NaN flag is set to the internal representation forma data discriminated as NaN data.

The NaN discriminating system of FIG. 19 comprises the precision detecting circuit 31, the precision holding register 33, the transform circuit 35, the maximum precision discriminating circuit 37, the NaN discriminating circuit 39, the floating-point number processing circuit 41, the inverse transform circuit 43, a NaN flag setting circuit 45, a flag detecting circuit 47 and a memory 49.

The NaN flag setting circuit 45 sets a NaN flag giving an indication of being NaN to the data discriminated as NaN in the NaN discriminating circuit 39. The NaN flagged data is supplied to the floating-point number processing circuit 41. This NaN flag setting circuit 45 directly supplies the floating-point number processing circuit 41 with the data discriminated not as NaN (but as a numeric value) in the NaN discriminating circuit 39.

The flag detecting circuit 47 is provided in the floating-point number processing circuit 41. The flag detecting circuit 47 detects the above NaN flag for discriminating NaN with respect to the data employed in the floating-point number processing circuit 41.

The memory 49 stores the in-use data in the floating-point number processing circuit 41 when implementing, e.g., an interrupt process.

Note that the output of the NaN discriminating circuit 39 is not directly given to the floating-point number processing circuit 41 but supplied to the NaN flag setting circuit 45. Other sections are the same as those in FIG. 2.

Figure 5:
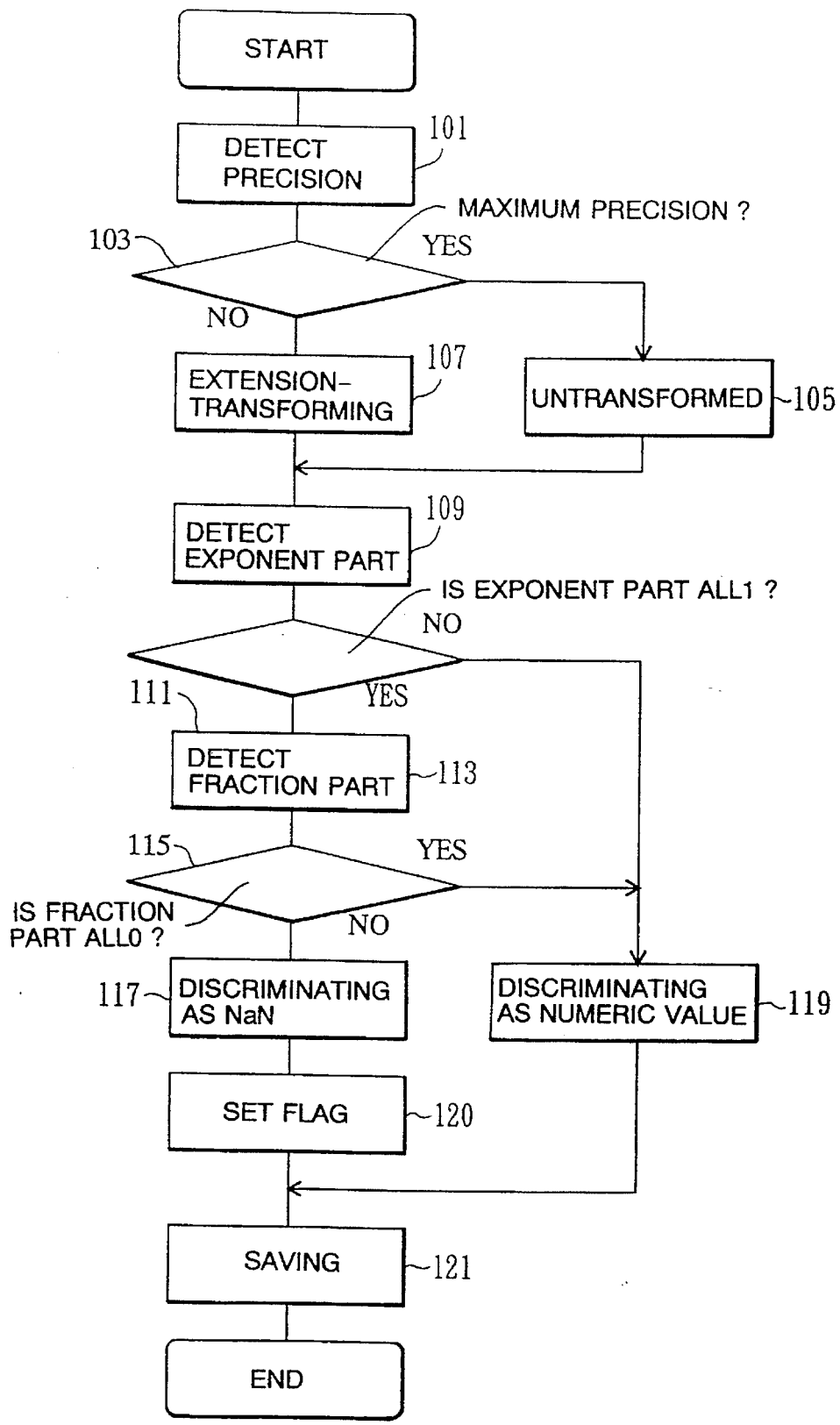
FIG. 5 is an explanatory flowchart showing processing operation when setting a NaN flag to data after the NaN discrimination in the system of FIG. 2.

In this case, as shown by a flow of processing of FIG. 5, the NaN flag setting circuit 45 sets the flag giving the indication of being NaN to the data defined as NaN (step 120).

Accordingly, the NaN discriminating circuit 39 discriminates the data as NaN with respect to the internal representation form extended to the maximum precision. Thereafter, the NaN flag setting circuit 45 sets the NaN flag to this data in front of the sign part. This data as NaN flagged data is supplied and saved in the floating-point number processing circuit 41. Once the data is NaN-flagged, the flag detecting circuit 47 thereafter only detects an existence or non-existence of this flag. A NaN detection is thereby attainable, and, therefore, the processing can be speeded up.

By the way, when executing the interrupt process in the course of processing the above NaN flagged data, the data has to be saved.

Figure 7:
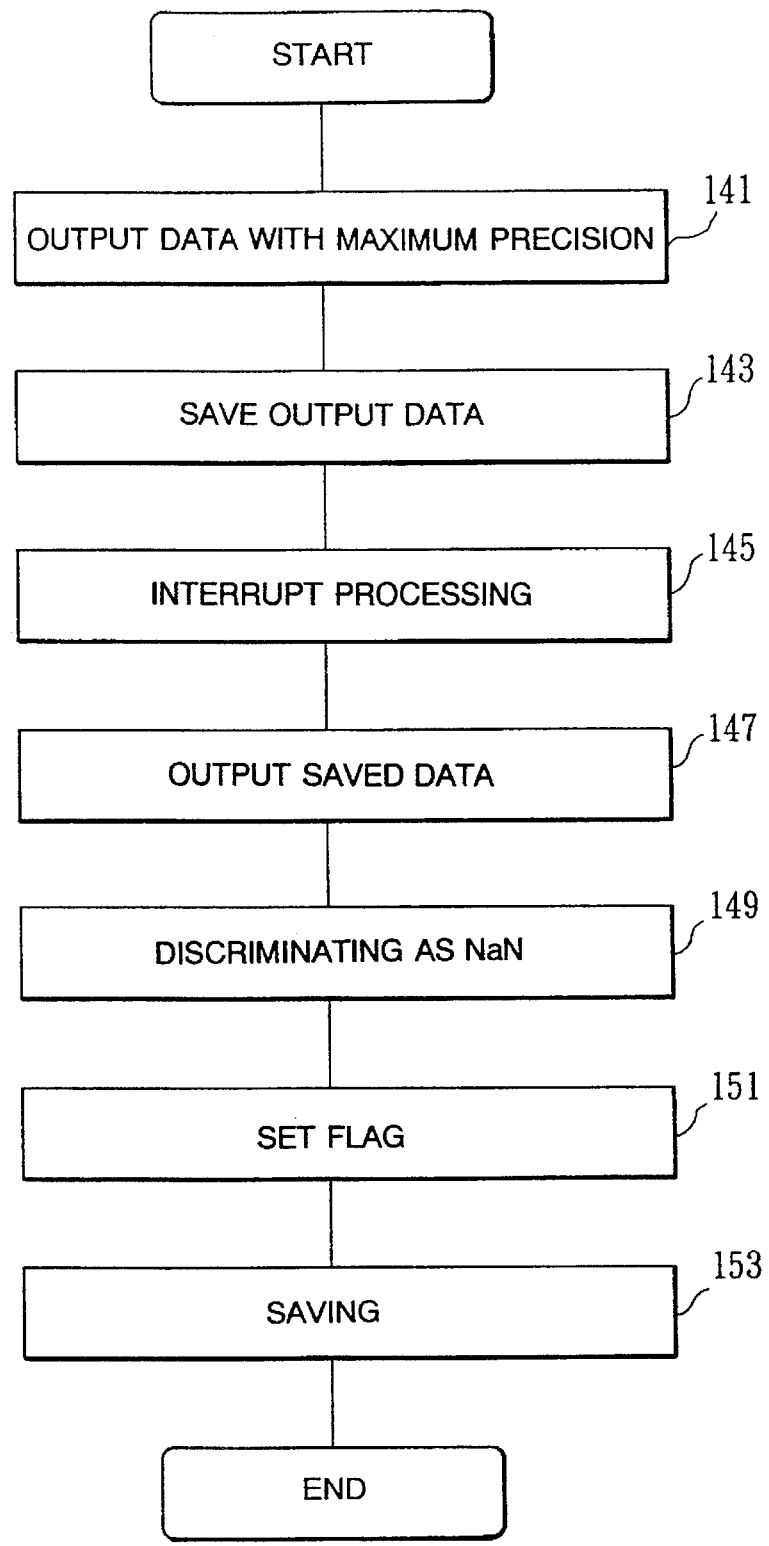
FIG. 7 is an explanatory flowchart showing data saving/restoring operation involved in interrupt processing in the system of FIG. 2.
Figure 8:
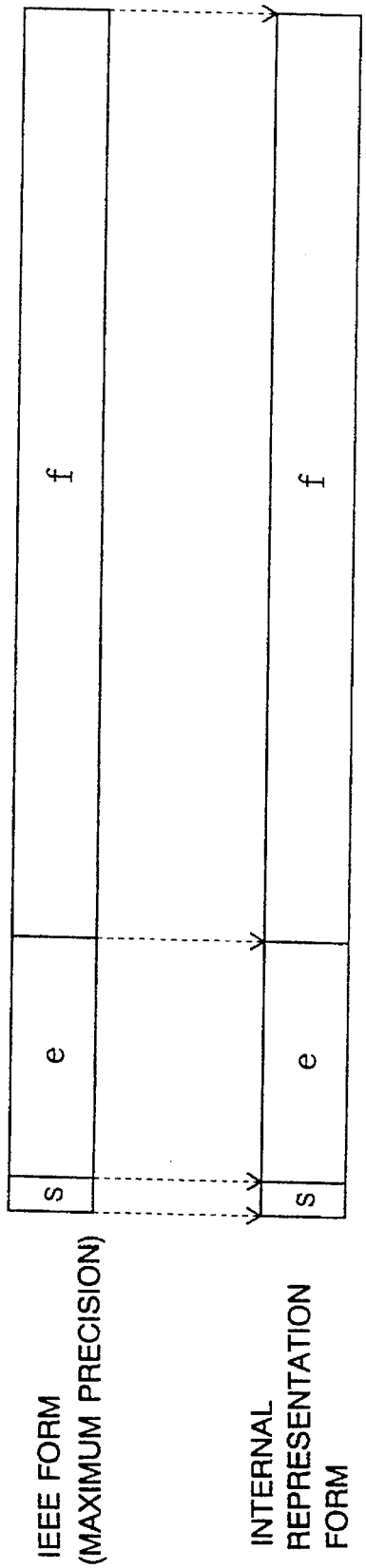
FIG. 8 is an explanatory diagram of a transform of the data, taking an IEEE form, of a maximum precision into an internal representation form in the system of FIG. 2.
Figure 9:
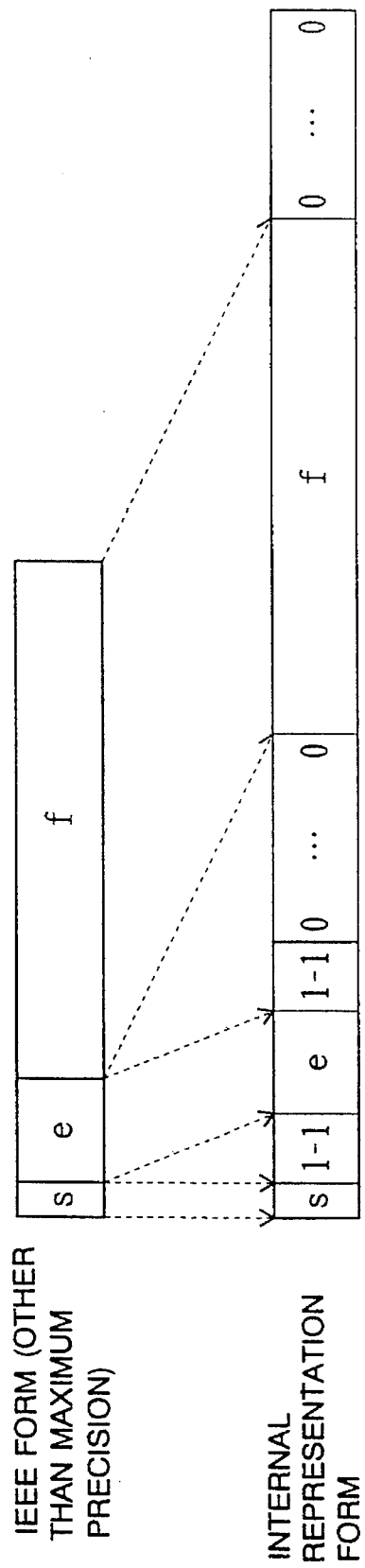
FIG. 9 is an explanatory diagram of a transform of the data, taking the IEEE form, of a precision less than the maximum precision into the internal representation form in the system of FIG. 2.
Figure 10:
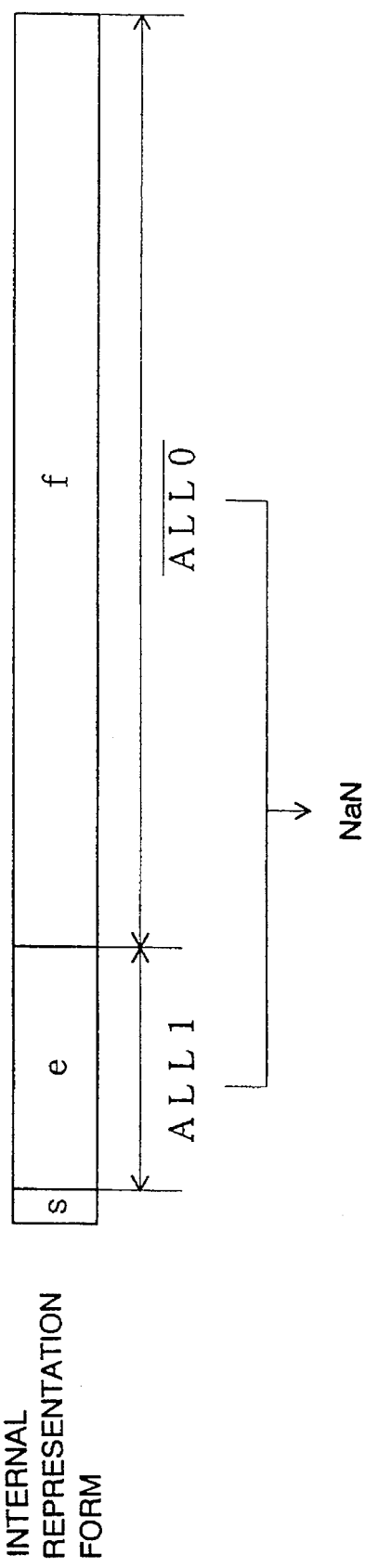
FIG. 10 is a diagram illustrating a data format in the internal representation form, showing NaN discriminating conditions in the system of FIG. 2.

A flow of processing of data saving/restoring operation described above will be described with reference to FIG. 7.

Figure 17:
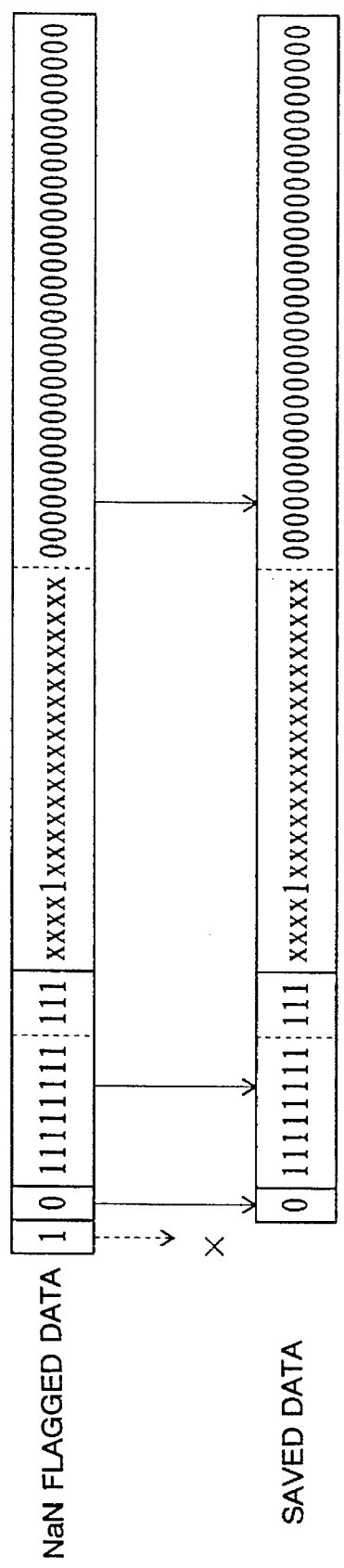
FIG. 17 is an explanatory diagram of saving of the NaN flagged data in the second embodiment of the NaN discriminating system of the present invention.

The 4-byte data is transformed into 8-byte data with the maximum precision. The 8-byte data undergoes a NaN discrimination and is NaN-flagged. The NaN flagged data turns out data as shown in FIG. 17. When interrupted, this internal representation form (i.e., maximum precision) data is outputted (step 141) and saved in the memory 49 (step 143). At this time, in a normal case, the memory 49 has no area for saving the flag and is therefore incapable of saving the NaN flag. As a result, the NaN flag is saved in the form of saved data shown in FIG. 17. After being saved, the interrupt process is executed (step 145).

Figure 18:
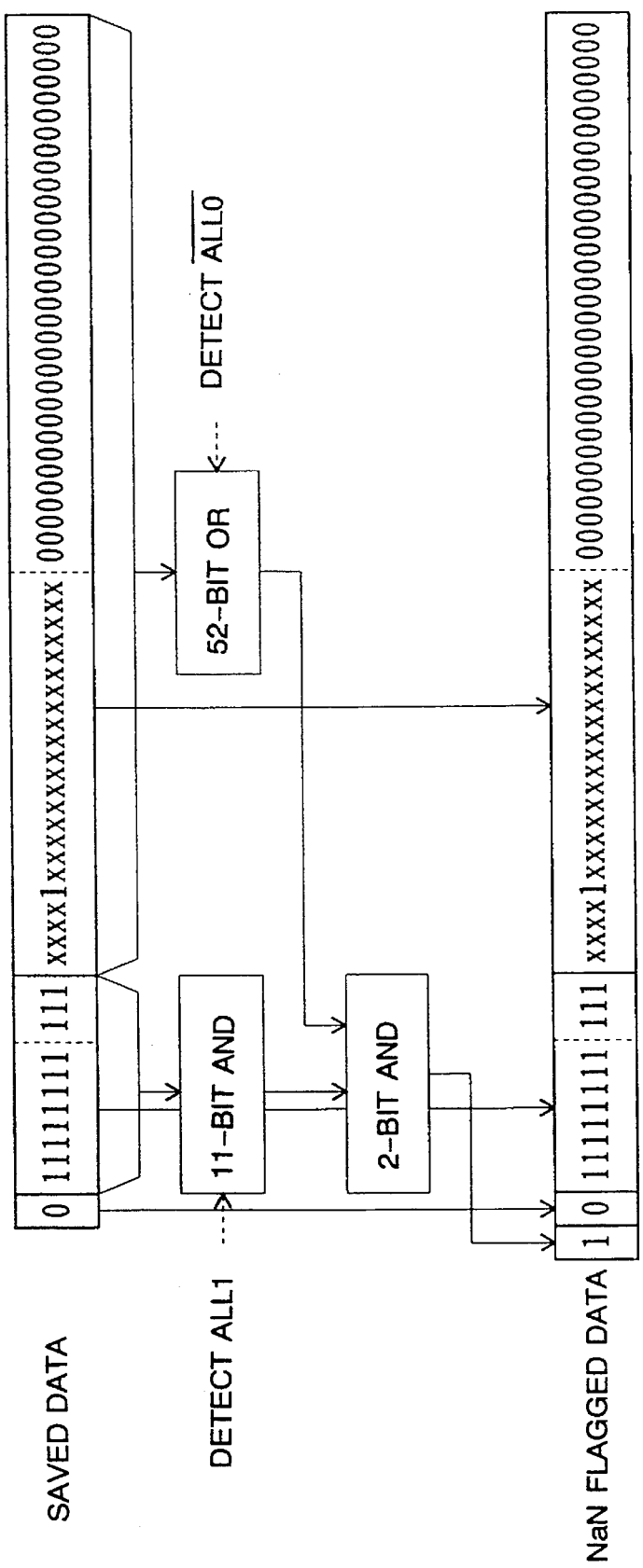
FIG. 18 is an explanatory diagram of restoring of the NaN flagged data in the second embodiment of the NaN discriminating system of the present invention.

After finishing this interrupt processing, the saved data (see FIG. 18) is outputted for restoring the data which has hitherto been saved (step 147). This outputted saved data itself is restored in a data part of the NaN flagged data. At this moment, the NaN discriminating circuit 39 makes the discrimination of being NaN by detecting ALL1 and ALL0 of the exponent part and the fraction part of the restored data (step 149). When discriminating the data as NaN, the flag setting circuit 45 NaN-flags the above data (step 151). In the case of FIG. 18, the exponent part is ALL1, but the fraction part is not ALL0. Hence, the data is discriminated as NaN, and a NaN flag of the restored NaN flagged data becomes '1'. The same data as the NaN flagged data of FIG. 17 is restored. The restored data is thereafter saved (step 153) and thus employed for the processing of the floating-point number.

[Embodiment 4]

The above-described NaN discriminating system according to the present invention is applicable to, e.g., a floating-point register.

Figure 20:
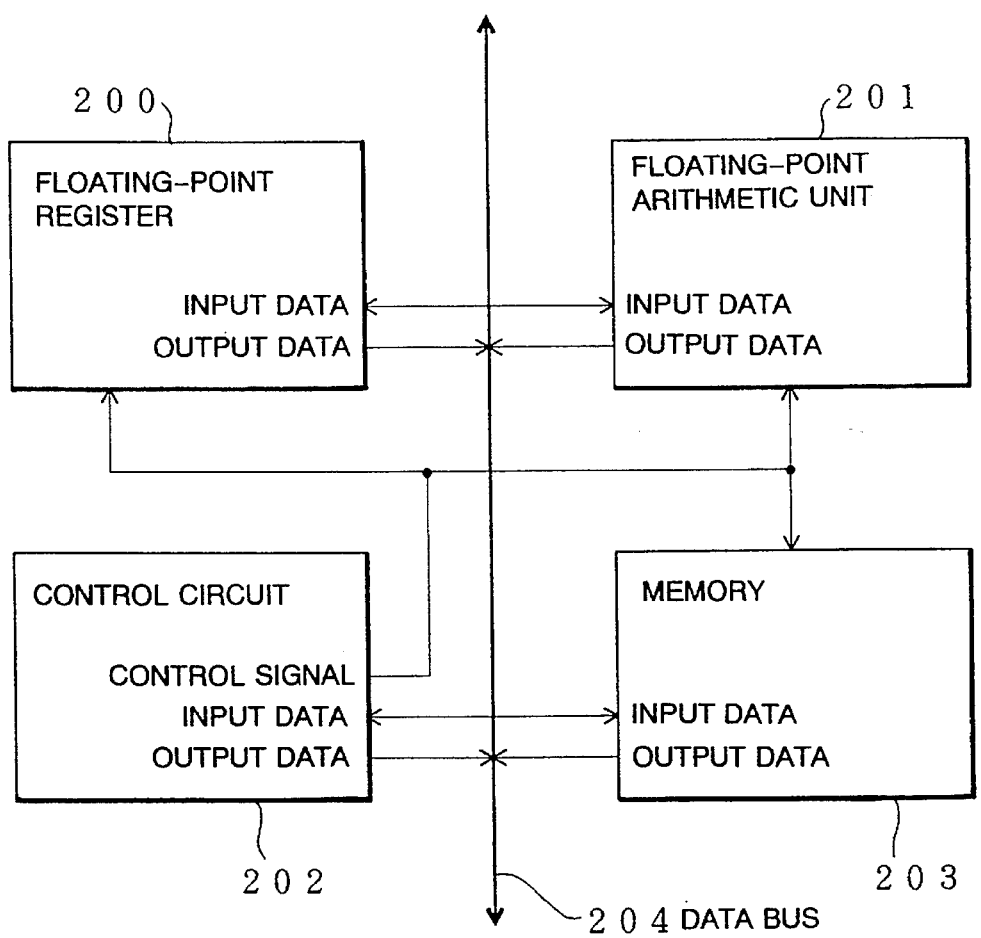
FIG. 20 is a block diagram showing one constructive example of a floating-point number arithmetic system to which floating-point registers of fourth and fifth embodiments of the present invention are applied.

The floating-point arithmetic is implemented by, e.g., an arithmetic system illustrated in FIG. 20.

The arithmetic system of FIG. 20 loads a floating-point register 200 via a data bus 204 with the floating-point number in a predetermined data form which is stored in a memory 203. A floating-point arithmetic unit 201 performs arithmetic processes such as an addition, a subtraction, a multiplication and a division with respect to the data in the floating-point register 200. A control circuit 202 controls respective sections relative to these arithmetic processes. Generally, in the system depicted in FIG. 20, the floating-point register 200 simply holds the data irrespective of being NaN/numeric. Each arithmetic unit 201 employing the data outputted from the floating-point register 200 detects whether the data is NaN or not.

Processing in the floating-point arithmetic unit 201 differs depending on whether the floating-point data is a numeric value or NaN. A conventional floating-point register 200, however, simply holds the data without making a distinction of being NaN/numeric. The floating-point arithmetic unit 201 therefore has to, when inputting the data, distinguish whether the input data is numeric or NaN through the NaN detecting circuit.

The above NaN discriminating system of the present invention is capable of implementing the NaN discrimination with a comparatively simple system architecture. The NaN discriminating system can be therefore incorporated into the above floating-point register section. As explained above, if the NaN discriminating system is incorporated into the floating-point register section, there is no necessity for providing the floating-point arithmetic unit with the NaN detecting circuit. When a plurality of floating-point arithmetic units are prepared, the NaN detecting circuit does not have to be separately provided.

Figure 21:
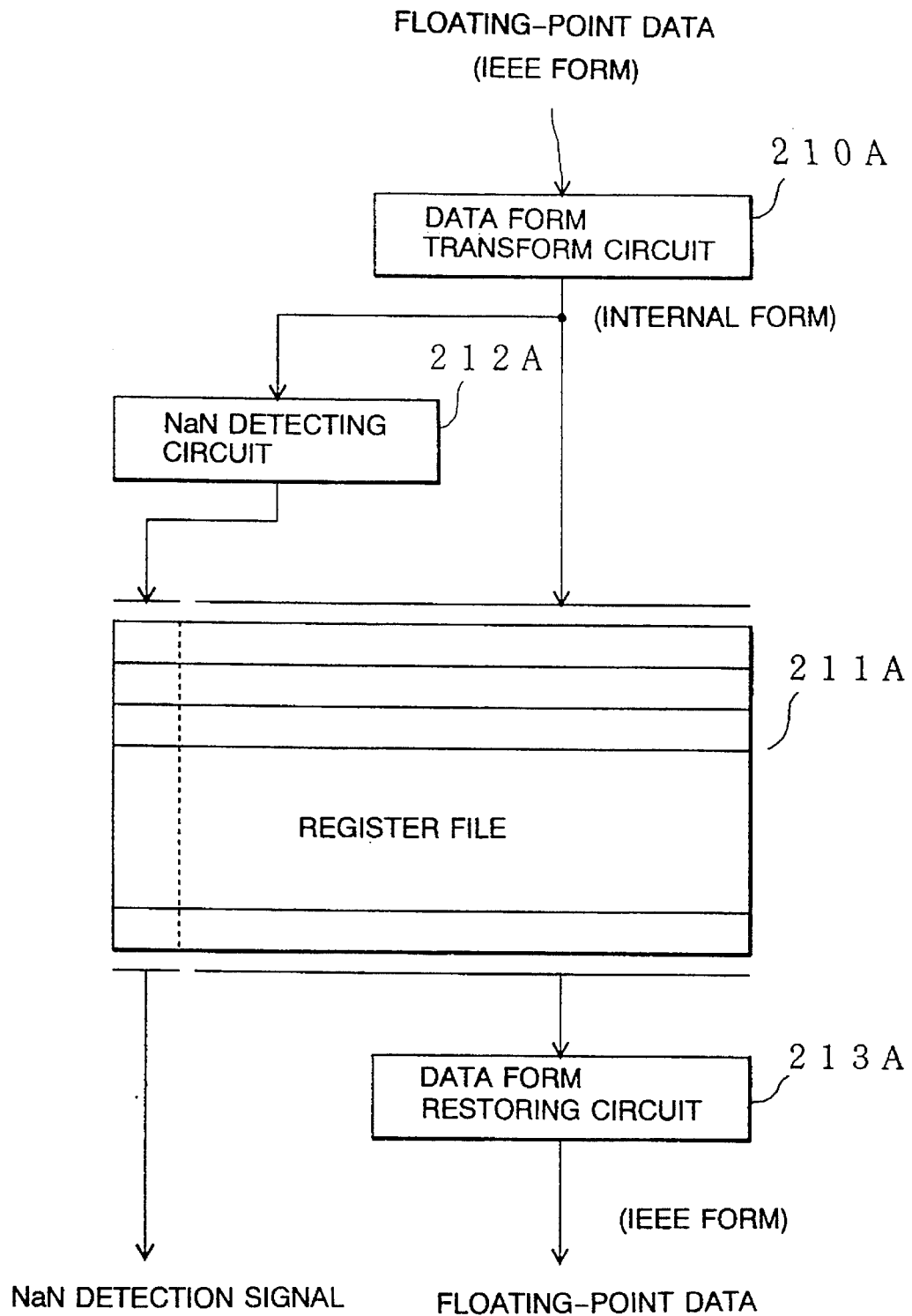
FIG. 21 is a block diagram schematically illustrating a configuration of the floating-point register in the fourth embodiment of the NaN discriminating system of the present invention.

Then, a fourth embodiment of the present invention provides a floating-point register incorporating the above NaN detecting system. FIG. 21 schematically illustrates a construction thereof.

The floating-point register shown in FIG. 21 is a register for storing binary floating-point numbers taking a predetermined data form to make a distinction between the numeric value and NaN as in the IEEE form. The floating-point register includes one or more independently readable or writable ports.

The floating-point register illustrated in FIG. 21 comprises a data form transform circuit 210A, a register file 211A, a NaN detecting circuit 212A and a data form restoring circuit 213A.

The data form transform circuit 210A transforms the floating-point data based on the IEEE form into an internal form which does not depend on the precision. Inputted to the NaN detecting circuit 212A is data transformed into the internal form by the data form transform circuit 210A. The NaN detecting circuit 212A detects whether the input data is NaN or not. The register file 211A stores the data transformed into the internal form by the data form transform circuit 210A together with a detection signal given from the NaN detecting circuit 212A. The data form restoring circuit 213A restores the internal form data read from the register file 211A to the previous IEEE form according to a pre-designated data precision.

Outputted, when reading the data, to the outside are the data restored by the data form restoring circuit 213A and the detection signal relative to NaN which corresponds to the data read from the register file 211A.

The floating-point register itself, which is shown in FIG. 21 and integral with the NaN detecting circuit 212A, is capable of detecting NaN regardless of the given data precision.

Namely, in the floating-point register illustrated in FIG. 21, during the normal writing process, the data form transform circuit 210A transforms the input data into the internal form from the IEEE form. The transformed input data is supplied to the NaN detecting circuit 212A. This NaN detecting circuit 212A detects whether the input data is NaN or not. This internal form data and a NaN detection signal are stored in the register file 211A. During the normal reading process, the internal form data in the register file 211A is transformed into the IEEE form by the data form restoring circuit 213A. The IEEE form data and the NaN detecting signal are outputted to the outside.

In this case, NaN is detected in the floating-point register, and the NaN detection signal is outputted. Hence, for instance, each floating-point arithmetic unit does not require the NaN detecting circuit, and the hardware can be simplified. Further, there is an advantage in which NaN is detected when writing the data, and therefore the NaN detection signal can be quickly outputted when in the reading process.

Note that a save/restore processing mechanism is capable of effecting the processes without being aware of the data precision and NaN by performing the read and write with the maximum data precision when saving and restoring contents of the register for the interrupt process.

Figure 22:
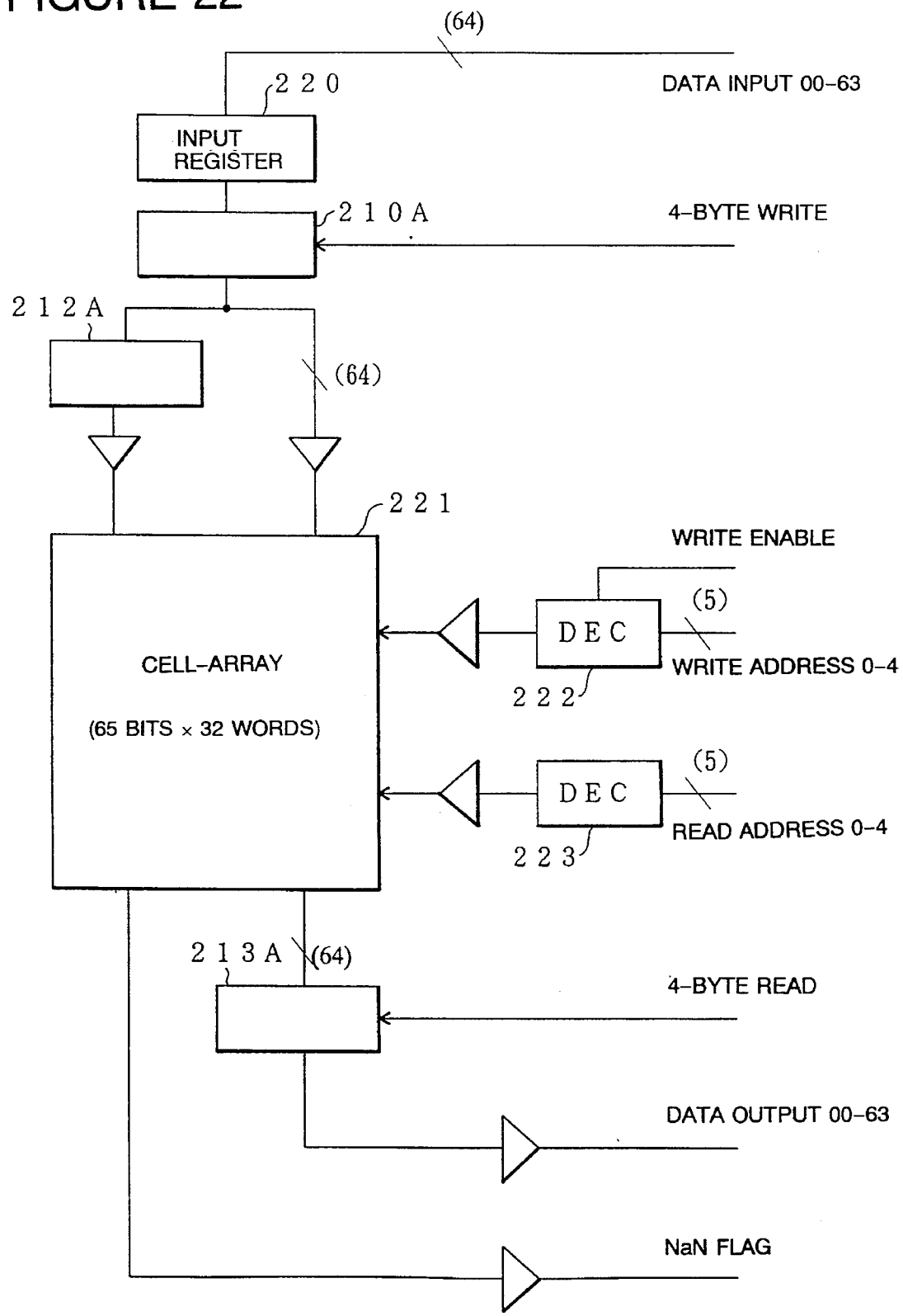
FIG. 22 is a block diagram showing a detailed configuration of the floating-point register of FIG. 21.

FIG. 22 shows one example of a more specific construction of the floating-point register of FIG. 21.

FIG. 22 illustrates the example of the floating-point register having a single port. In this instance, the precision of the input data is, it is considered, classified into two types of a 4-byte precision (single precision) and an 8-byte precision (double precision).

The floating-point register of FIG. 22 includes the data form transform circuit 210A, the NaN detecting circuit 212A, the data form restoring circuit 213A, an input register 220, a cell-array 221 and decoders 222, 223.

Referring to FIG. 22, the input register 220 is a register for temporarily holding the input data in the IEEE form. The data form transform circuit 210A, the NaN detecting circuit 212A and the data form restoring circuit 213A correspond to sections marked with the same symbols in FIG. 21.

The cell-array 221 corresponds to the register file 211A shown in FIG. 21. The cell-array 221 has a capacity enough to store 32 items of 65-bit data consisting of 64-bit internal form data and a 1-bit flag (hereinafter termed a "NaN flag") corresponding to the NaN detection signal.

The decoder 222 decodes a write address signal and outputs a signal indicating which area of the cell-array 21 the internal form data is written to. The decoder 223 decodes a read address signal and outputs a signal indicating which area of the cell-array 21 the internal form data is read from.

An operation of this floating-point register of FIG. 22 will be explained.

In this example, the internal form of the data stored in the cell-array 221 is set in the same form as the floating-point number in which the widths of the exponent and faction parts are 8 bits. More specifically, in the case of the input data being 4 bytes, the form is transformed into the 8-byte form. In the case of the input data being 8 bytes, the form remains as it is, and the data are stored in the cell-array 221.

For example, it is assumed that the input data having a 4-byte length as shown in FIG. 23 is stored in the floating-point register. This input data is set in the input register 220. This data is NaN. It is because, as illustrated in FIG. 23, the exponent part e is ALL1, and the fraction part f contains 1.

In the normal writing operation, the 4-byte data inputted to the input register 220 is supplied to the data form transform circuit 210A. The 4-byte data is transformed by the data form transform circuit 210A in response to a 4-byte write signal. FIG. 24 shows a result of this transform.

The 4-byte data transform is performed, for instance, in the following manner.

The fraction part f of bit numbers 9–31 is shifted by 3 bits toward a low-order bit side (right side in the FIGURE) and occupies the bit numbers 12–34. Three bits of the bit numbers 9–11 on the low-order side (right side in the FIGURE) of the exponent part e are thereby emptied. The emptied part is filled with '1' to adjust a bit length of the exponent e. Further, a part of bit numbers 35–63 is also filled with '0' to adjust a bit length of the fraction part f.

Note that the 4-byte data transform may be implemented in place of the above transform in such a manner that: the exponent part e and the fraction part f are shifted en bloc by 3 bits toward the low-order side; the 3-bit part emptied on the high-order side of the exponent e is filled with '1'; and the part of the bit numbers 35–63 on the low-order side of the fraction part f is filled with '0'.

A result of this 4-byte data transform is inputted to the NaN detecting circuit 212A and used for the NaN detection. The NaN detecting circuit 212A makes a discrimination of being NaN when the exponent part is ALL1, and the fraction part is not ALL0.

A transform result from the data form transform circuit 210A and a detection result from the NaN detecting circuit 212A are stored in positions designated by the write address signals in the cell-array 221 when a write enable signal is '1'.

FIG. 25 shows an internal data storage state in the cell-array 221. A NaN flag indicating whether the data is NaN or not (on the basis of the detection result from the NaN detecting circuit 212A) enters the NaN bit. In this example, the input data is NaN, and, therefore, the NaN bit is '1'.

In the normal reading operation from the cell-array 221, the data is read from the position designated by the read address in the cell-array 221. The 4-byte data is inverse-transformed by the data form restoring circuit 213A in response to a 4-byte read signal with respect to a 64-bit data part exclusive of the NaN bits. A result of this inverse transform is outputted as a data output, and simultaneously, the NaN bits are outputted as the NaN flags. FIG. 26 illustrates an example of the data read and outputted from the cell-array 221.

Figure 27:
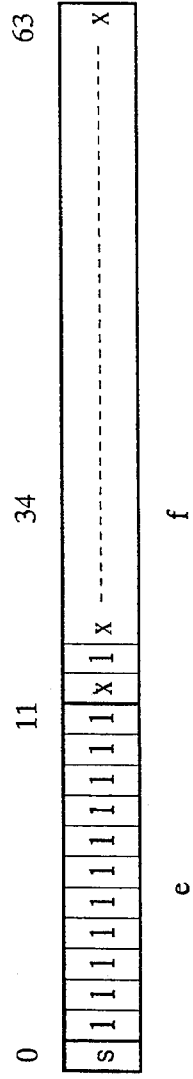
FIG. 27 is an explanatory diagram of the data structure, showing the operation of the floating-point registers of FIGS. 21 and 22.
Figure 28:
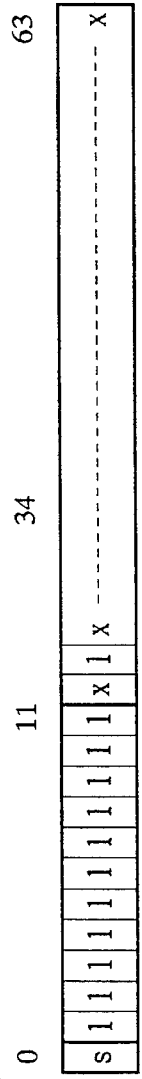
FIG. 28 is an explanatory diagram of the data structure, showing the operation of the floating-point registers of FIGS. 21 and 22.

On the other hand, an example of processing the 8-byte input data will be explained with reference to FIGS. 27—30. The 8-byte data inputted normally when writing but shown in FIG. 27 is not, as a matter of fact, transformed by the data form transform circuit 210A. The data in the as-is form illustrated in FIG. 28 is outputted from the data form transform circuit 210A. This data is inputted to the NaN detecting circuit 212A and used for the NaN detection.

Figure 29:
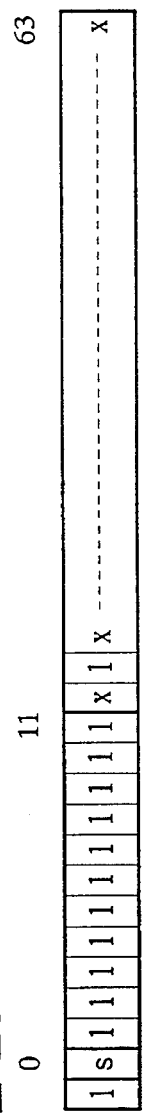
FIG. 29 is an explanatory diagram of the data structure, showing operation of the floating-point registers of FIGS. 21 and 22.

FIG. 29 shows an internal data storage state in the cell-array 221 in this instance. The NaN flag based on the detection by the NaN detecting circuit 212A is set in the NaN bit. In this case, the input data is NaN, and hence, the NaN bit is '1'. Whereas if the input data is not NaN, the NaN bit is '0'.

Figure 30:
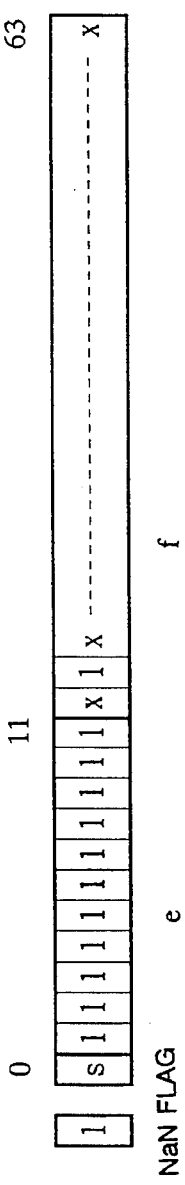
FIG. 30 is an explanatory diagram of the data structure, showing the operation of the floating-point registers of FIGS. 21 and 22.

During the normal reading process, a 64-bit data part of the cell array 221 undergoes no inverse transform in the data form restoring circuit 213A and is therefore outputted as it is. FIGS. 30 shows the NaN flag and the output of the floating-point data.

Given next is an explanation of how the contents of the register are saved and restored as in the case of the interrupt process.

FIG. 31 illustrates an internal data storage state in the cell-array 221 when the 4-byte and 8-byte NaN/numeric data are inputted respectively by the normal writing process. The NaN bits of the NaN data are headed by '1'.

When saved, the 4-byte read signal is set to '0'. When the data outputted from the cell-array 221 pass through the data form restoring circuit 213A, all the data are read in the form of the 8-byte data defined as the maximum precision. Accordingly, no transform of the data form takes place. In the normal case, the location where the saved data are stored is a memory. The area for storing the NaN flag (NaN flag) does not exist on the memory, and, hence, the saved data turns out as shown in FIG. 32.

When the data pass through the data form transform circuit 210 on the occasion of the restoration from the register, the 4-byte write signal is set to '0'. All the data are written in 8 bytes defined as the maximum precision. For this reason, the data form transform circuit 210A performs no transform. However, the NaN detecting circuit 212A sets the NaN flags. The NaN data of the data to be restored have the NaN flags which, at this time, become '1'.

As a result, the data to be restored turn out the same data as the pre-saved data shown in FIG. 31.

Thus, it is possible to construct the floating-point register capable of detecting NaN without being aware of the data precision. This also eliminates the necessity for providing each arithmetic unit with the NaN detecting circuit. Further, the NaN detection is conducted in the internal form status, and the uniform detection is therefore attainable. The I/O (input/output) and saving/restoring operation can be performed as in the same way with conventional system.

[Embodiment 5]

Figure 33:
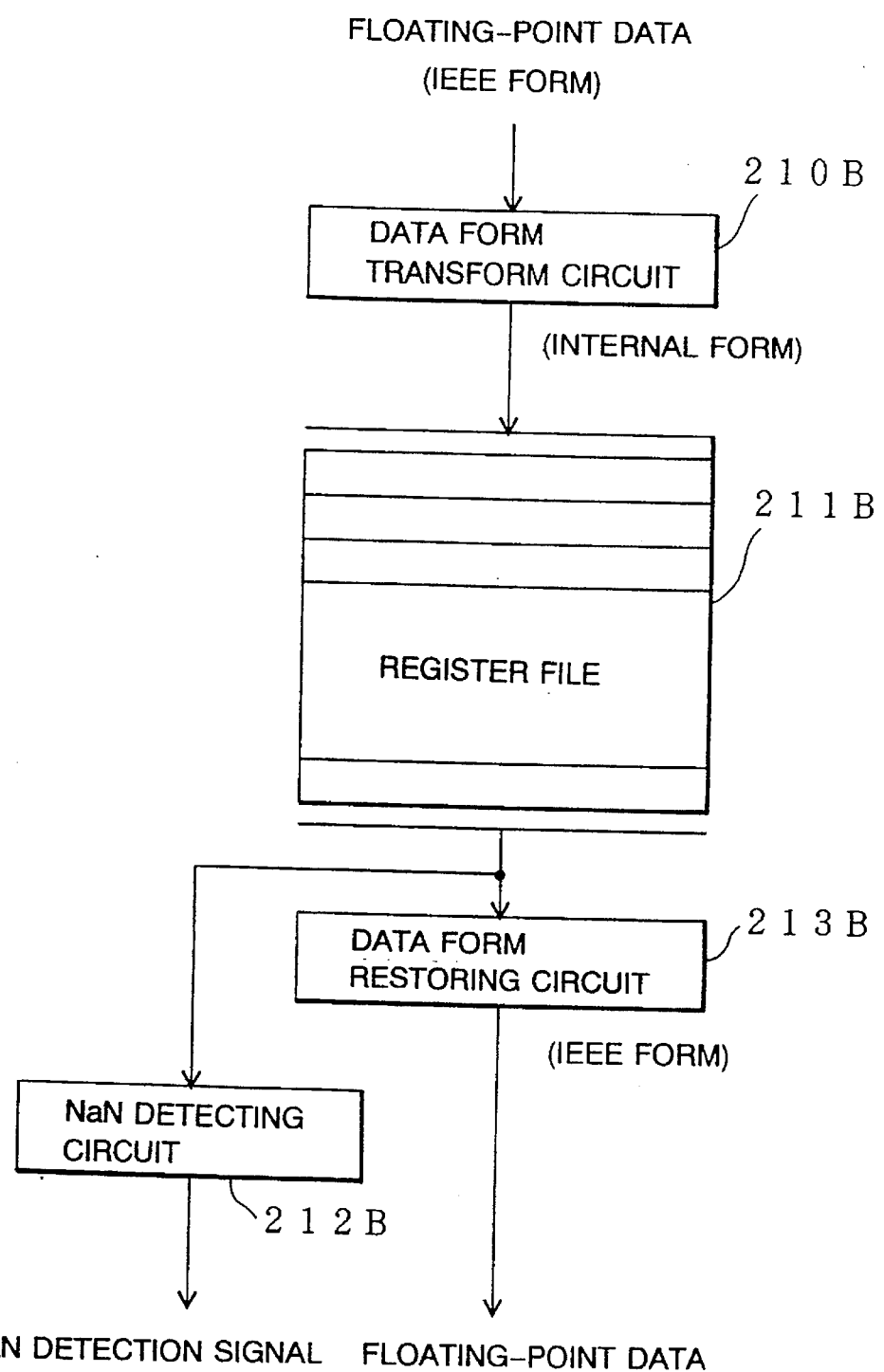
FIG. 33 is a block diagram schematically illustrating a configuration of the floating-point register in the fifth embodiment of the NaN discriminating system of the present invention.

A fifth embodiment of the present invention also provides other floating-point register incorporating the NaN detecting system. FIG. 33 schematically illustrates a construction thereof.

The floating-point register shown in FIG. 33 comprises a data form transform circuit 210B, a register file 211B, a NaN detecting circuit 212B and a data form restoring circuit 213B.

The data form transform circuit 210B transforms the floating-point data based on the IEEE form into an internal form which does not depend on the precision. The register file 211B stores the data transformed into the internal form by the data form transform circuit 210B. The NaN detecting circuit 212B detects whether or the data read from the register file 211B is NaN or not. The data form restoring circuit 213B restores the internal form data read from the register file 211B to the previous IEEE form according to a designated data precision.

Outputted, when reading the data, to the outside are the data restored by the data form restoring circuit 213B and the detection signal from the NaN detecting circuit 212B.

The floating-point register-itself, which is shown in FIG. 33 and integral with the NaN detecting circuit 212B, is capable of detecting NaN regardless of the given data precision.

In the floating-point register illustrated in FIG. 33, during the normal writing process, the data form transform circuit 210B re-transforms the input data into the internal form from the IEEE form. At the same time, the NaN detecting circuit 212B whether the data is NaN or not. The data in the IEEE form and the NaN detection signal are outputted to the outside.

In the case of the floating-point register of FIG. 33, the NaN detection is carried out when reading the data. The writing process is therefore speeded up. Further, in the register file 211B, the data length corresponding to the internal form may suffice.

Figure 34:
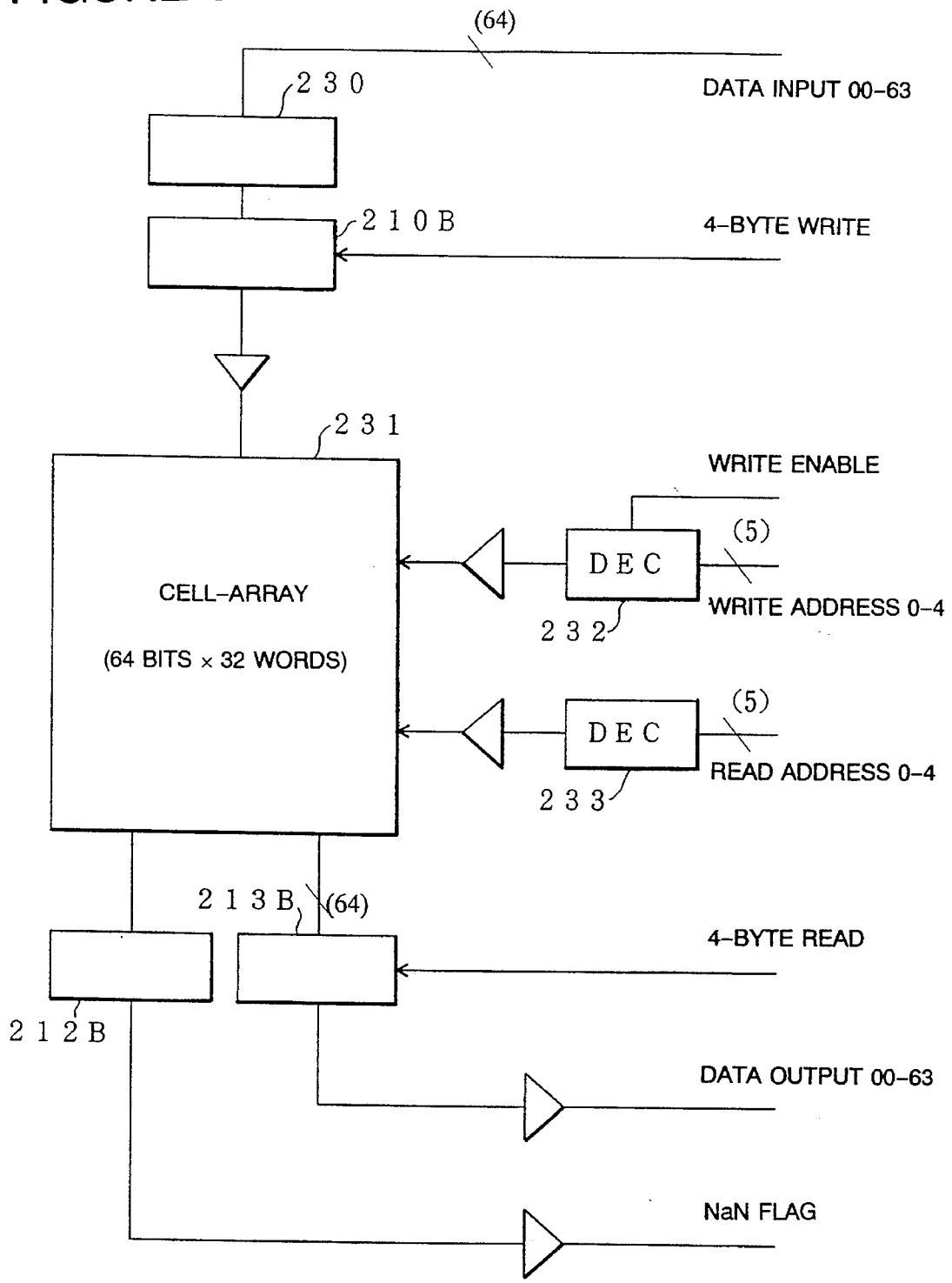
FIG. 34 is a block diagram showing a detailed configuration of the floating-point register of FIG. 33.

FIG. 34 shows one example of a further specific construction of the floating-point register of FIG. 33.

FIG. 34 also illustrates, as in FIG. 22, an example of the single-port floating-point register. Considered are the input data of two types of 4- and 8-byte precisions.

The floating-point register of FIG. 34 includes the data form transform circuit 210B, the NaN detecting circuit 212B, the data form restoring circuit 213B, an input register 230, a cell-array 231 and decoders 232, 233.

Referring to FIG. 34, the input register 230 is a register for temporarily holding the input data. The cell-array 231 corresponds to the register file 211B shown in FIG. 33 and has a capacity for 32 words in a 64-bit data length. The decoders 232, 233 each decode write and read addresses. Further, the data form transform circuit 210B, the NaN detecting circuit 212B and the data form restoring circuit 213B correspond to those marked with the same symbols in FIG. 33.

The following is a difference between the floating-point register shown in FIG. 34 and the floating-point register illustrated in FIG. 22.

In the floating-point register of FIG. 22, the NaN detection is effected when written to the cell-array 221. Contrastingly in the floating-point of FIG. 34, the NaN detection is executed not when writing the data but when reading the data. Accordingly, the cell-array 231 stores only the internal form data but does not store the NaN flag indicating whether the data is NaN or not.

That is, normally when written, the data form transform circuit 210B performs-the same transform with the data form transform circuit 210A shown in FIG. 22. However, an output thereof is merely stored in the cell-array 231. The NaN detection is not conducted.

Next, normally when read, the 64-bit data part outputted from the cell-array 231 is processed by the data form restoring circuit 213B. When the 4-byte read signal is '1', the data is outputted by effecting the inverse transform into the 4-byte data form. When the 4-byte read signal is '0', the data is outputted intactly in the 8-byte data form.

At this data outputting time, the NaN detecting circuit 212B performs the NaN detection with respect to the data read from the cell-array 231. If NaN is detected, the NaN flag is set to '1'. Whereas if NaN is not detected, the NaN flag is set to '0'. The data is thus outputted.

The data stored in the register are saved and restored in the same way as that in the case of FIG. 22. On the occasion of saving, all the data are outputted in 8 bytes defined as the maximum precision. Further, on the occasion of restoring, all the data are written in 8 bytes defined as the maximum precision. With this processing, the restored data turn out the same data as those before being saved.

Figure 35:
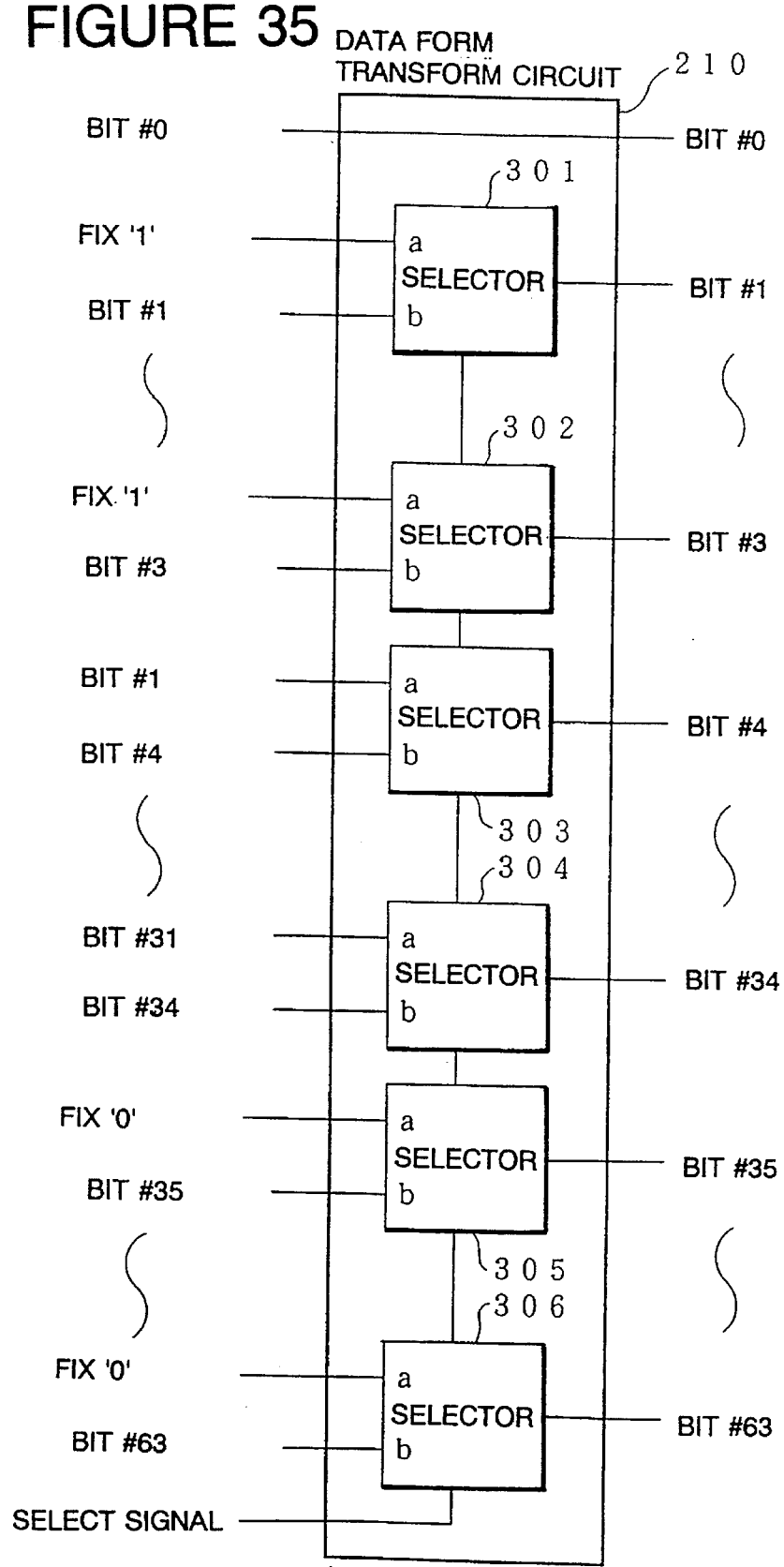
FIG. 35 is a block diagram showing a specific configuration of a data form transform circuit of the floating-point registers of FIGS. 21, 22, 33 and 34.

FIG. 35 illustrates a specific example of the data form transform circuit relative to the fourth and fifth embodiments.

The data form transform circuit 210A shown in FIG. 22 is substantially identical with the data form transform circuit 210B shown in FIG. 34. The circuit is therefore illustrated as a data form transform circuit 210.

A bit #0 (bit number 0) of the sign part s of the input data is outputted intactly as the bit #0. Selectors 301–306 work in response to select signals. The selectors 301–306 select and output one of inputs a and b. The above select signals are the 4-byte write signals shown in FIGS. 22 and 34. In this case, the selectors 301–306 select, when the select signal is '1', the input a but select, when the select signal is '0', the input b.

Namely, when the input data consists of 4 bytes of the single precision, the data is transformed in the following manner. Bits #1–#3 after being transformed are outputted with a fixation to '1'. Bits #4–#34 are outputted while shifting previous bits #4–#31. The bits #35–#63 are outputted with a fixation to '0'.

When the input data consists of 8 bytes of the double precision, bits #0–#63 are outputted as they were.

Figure 36:
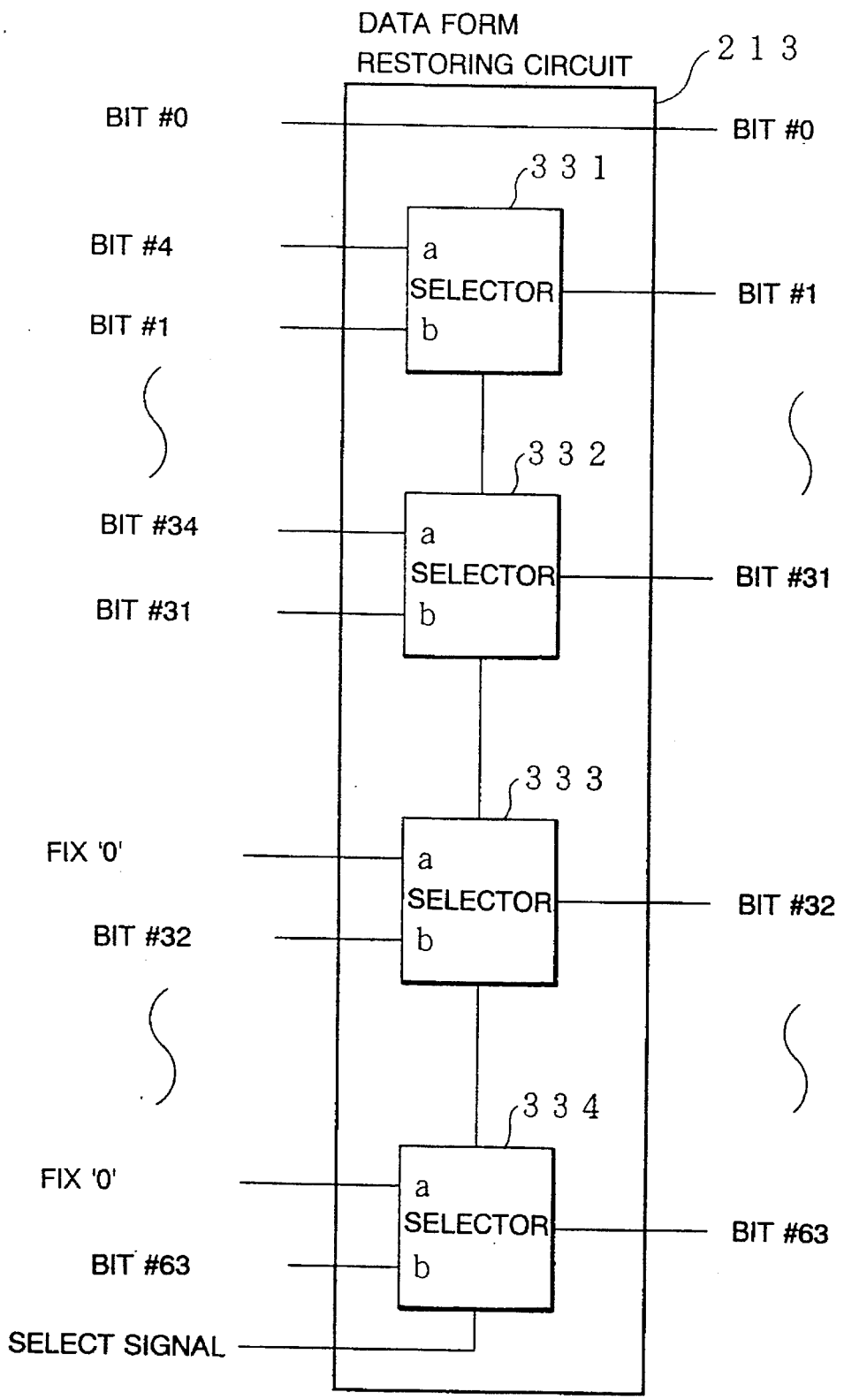
FIG. 36 is a block diagram showing a specific configuration of a data form restoring circuit of the floating-point registers of FIGS. 21, 22, 33, and 34.

FIG. 36 illustrates a specific example of the data form restoring circuit relative to the fourth and fifth embodiment.

The data form restoring circuit 213A shown in FIG. 22 is substantially identical with the data form restoring circuit 213B shown in FIG. 34. The circuit is therefore illustrated as a data form restoring circuit 213.

The bit #0 of the sign part s is outputted intactly as the bit #0. Selectors 331–334 work in response to the select signals. The selectors 331–334 select and output one of the inputs a and b. These select signals are the 4-byte read signals shown in FIGS. 22 and 34. In this case, the selectors 331–334 select the input a, when the select signal is '1', and select the input b, when the select signal is '0'.

Namely, when inverse-transforming the data into 4 bytes of the single precision, the data is transformed in the following manner. The bits #1–#31 after being inverse-transformed are outputted while shifting the bits #4–#34 inclusive before the inverse-transform. The bits #32–#63 after the inverse transform are outputted with the fixation to '0'.

When outputted in 8 bytes of the double precision, the bits #0–#63 are outputted in the as-is form when read from the cell-array 221 or 231.

Figure 37:
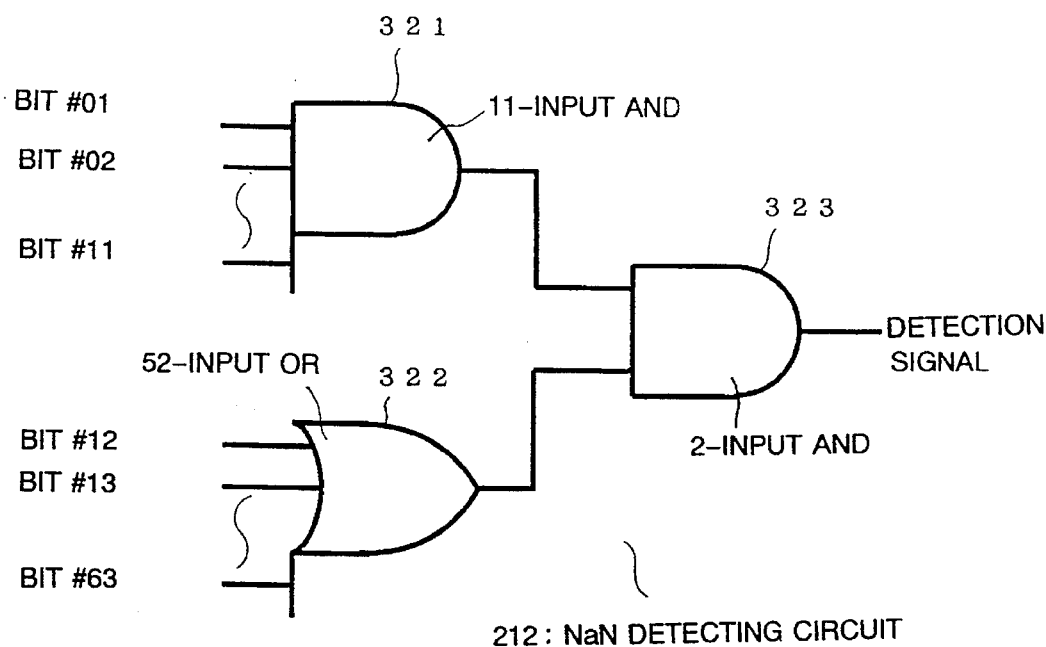
FIG. 37 is a block diagram showing a specific configuration of a NaN detecting circuit of the floating-point registers of FIGS. 21, 22, 33 and 34.
Figure 38:
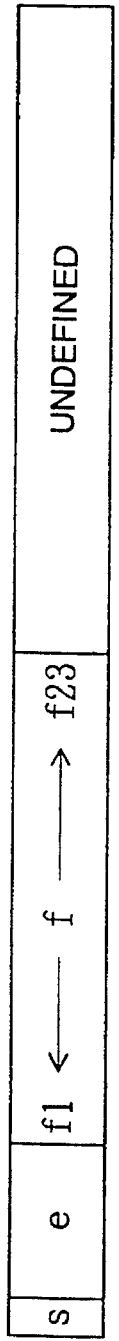
FIG. 38 is a diagram showing a single precision floating-point number in the IEEE form.
Figure 39:
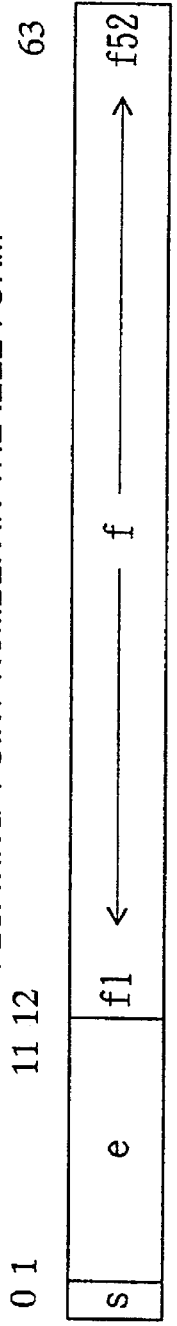
FIG. 39 is a diagram showing a double precision floating-point number in the IEEE form.
Figure 40:
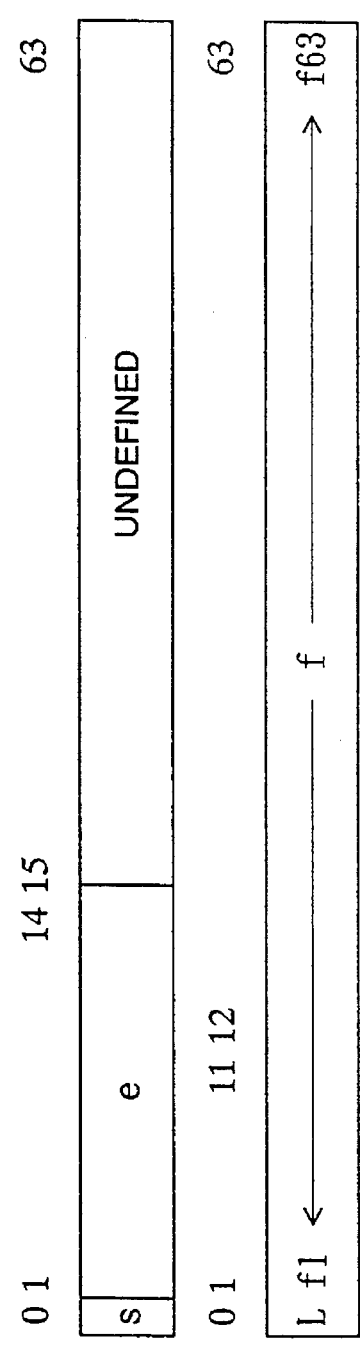
FIG. 40 is a diagram showing an extended double precision floating-point number in the IEEE form.

FIG. 37 shows a specific example of the NaN detecting circuit relative to the fourth and fifth embodiments.

The NaN detecting circuit 212A illustrated in FIG. 22 is substantially identical with the NaN detecting circuit 212B shown in FIG. 34. The circuit is therefore shown as a NaN detecting circuit 212.

Inputted to an 11-input AND circuit 321 are bits #01–11 of the data transformed into the internal form by the data form transform circuit 210A or 210B. If all these inputs are '1', an output of the AND circuit 321 becomes '1'. Further, bits #12–63 in the internal form are inputted to a 52-input OR circuit 322. If a value of at least one of these inputs is '1', the output becomes '1'.

Outputs of the AND circuit 321 and the OR circuit 322 are inputted to a 2-input AND circuit 323, and an output thereof is set as a NaN detection signal. The NaN detection signal becomes '1' when the input data is NaN but '0' when being a normal numeric value.

For simplifying the explanation, there have been given the examples related to the single-port floating-point register. A multiport floating-point register can be, as a matter of course, embodied in the same way.

According to the above-described fourth and fifth embodiments of the present invention, it is possible to construct the floating-point register capable of detecting NaN irrespective of the data precision. The NaN detecting circuit is not required to be provided in each arithmetic unit. The hardware architecture of the whole floating-point arithmetic system can be simplified. Further, the NaN detection is done in the internal representation form status, and therefore the NaN detection can be implemented with a uniformity. In addition, the I/O and saving/restoring operation may be substantially the same with the conventional system. The present invention is applicable without a large change in terms of the system.

INDUSTRIAL APPLICABILITY

According to the method of and the apparatus for discriminating NaN in the present invention, the floating-point number is transformed into the internal representation form data with the maximum precision, and the NaN discrimination is thus conducted. Hence, the NaN discrimination with respect to every precision can be done by only the NaN discriminating section for use with the maximum precision.

Moreover, the NaN flagged data is generated based on the result of the NaN discrimination, thereby making it possible to discriminate NaN at a much higher speed. Besides, even if the NaN flag is not saved when saving the data, the NaN flag can be simply set in the same way as discriminating NaN when restored. The rational NaN discrimination can be attained.

We claim:

1. A method of discriminating NaN of a binary floating-point number having a sign part composed of at least 1 bit, an exponent part composed of a plurality of bits and a fraction part composed of a plurality of bits, in which data is defined as NaN on condition that "all values of respective bits of the exponent part are '1', and all values of respective bits of the fraction part are not '0'", said method characterized by comprising the steps of:

setting the data as it is in an internal representation form when a precision of the binary floating-point number is a maximum precision;

setting the sign part as it is; extending the exponent part to a number of bits of an exponent part of the maximum precision and filling a deficient bit part due to this extension with '1'; and extending the fraction part to a number of bits of a fraction part of the maximum precision and filling a deficient bit part due to this extension with '0'; when the precision of the binary floating-point number is less than the maximum precision, thus performing such a transform process and setting a result of this transform as the data in the internal representation form; and discriminating NaN on condition that all digits of the exponent part of the internal representation form data being '1' is satisfied, and all digits of the fraction part being '0' is not satisfied.

2. The method according to claim 1, further comprising the steps of setting or resetting a NaN flag indicating whether the data is NaN or not is set to the internal representation form data on the basis of the NaN discrimination of the internal representation form data, NaN flagged data is thus obtained, and detecting the NaN flag for the NaN discrimination thereafter.

3. The method according to claim 2, further comprising the steps of outputting only a data part of the NaN flagged data when saving the NaN flagged data, inputting the saved data as a data part of the NaN flagged data when restored, and setting a result of the NaN discrimination as a NaN flag to the restored data.

4. The method according to claim 1, further comprising the steps of referring to a previous precision, setting the sign part as it is, setting the exponent part down to the previous precision with an elimination of the extended bit part, setting the fraction part down to the previous precision with an elimination of the extended bit part, combining these sign, exponent and fraction parts, and returning the internal representation form data extended to the maximum precision to the floating-point number of a previous precision.

5. An apparatus for discriminating NaN of a floating-point number, comprising:

a precision detecting means for detecting a precision of the floating-point number having a sign part, an exponent part and a fraction part;

a maximum precision discriminating means for discriminating whether or not the detected precision is a maximum precision;

a transforming means for transforming the floating-point number into internal representation form data; and a NaN discriminating means for effecting a NaN discrimination with respect to the internal representation form data, characterized in that said transforming means includes a means for setting, when said maximum precision discriminating means discriminates that "Precision= Maximum Precision", the data of the floating-point number intactly as the internal representation form data, said means setting, when said maximum precision discriminating means discriminates that "Precision<Maximum Precision", the sign part of the floating-point number as it is, extending the exponent part to the maximum precision to fill an extended bit part with '1' and also extending the fraction part to the maximum precision to fill an extended bit part with '0', and that said NaN discriminating means comprises a means for discriminating the floating-point number data as NaN when all the exponent part of the internal representation form data is '1', and all the fraction part is not '0'.

6. The apparatus according to claim 5, further comprising a NaN flag setting means for setting a NaN flag to the internal representation form data to provide NaN flagged data when said NaN discriminating means discriminates whether the data is NaN or not after being transformed into the internal representation form data of the maximum precision, and a flag detecting means for detecting the NaN flag.

7. The apparatus according to claim 6, further comprising a data saving means for saving and storing only a data part exclusive of the flag part in the NaN flagged data, and a data restoring means for restoring and setting the NaN flag to the restored data on the basis of a result of discrimination thereof.

8. The apparatus according to claim 5, further comprising an inverse transform means for returning the internal representation form data extended to the maximum precision to the floating-point number of a previous precision by, with reference to the previous precision, setting the sign part as it is, setting the exponent part down to the previous precision with an elimination of the extended bit part, setting also the fraction part down to the previous precision with an elimination of the extended bits and combining these sign, exponent and fraction parts.

9. The apparatus according to claim 5, further comprising a precision holding means for holding an original precision of the floating-point number which has been detected by said precision detecting means, wherein said transform means includes a means for setting a difference, as an extension, between the original precision held by said precision holding means and a predetermined maximum precision.

10. The apparatus according to claim 8, further comprising a precision holding means for holding an original precision of the floating-point number which has been detected by said precision detecting means, wherein said inverse transform means includes a means for setting, with reference to the original precision held by said precision holding means, the difference, as an extension, between the original precision and the predetermined precision, eliminating this extension from the data extended to the maximum precision and thus returning the data to the previous precision.

11. The apparatus according to claim 5, wherein said NaN discriminating means includes:

an exponent part detecting means for detecting a value of the exponent part of the internal representation form data;

an exponent part condition discriminating means for discriminating whether or not all values of respective bits of the exponent part are '1', these values being detected by said exponent part detecting means;

a fraction part detecting means for detecting a value of the fraction part of the internal representation form data;

a fraction part condition discriminating means for discriminating whether or not all values of respective bits of the fraction part are '0', these values being detected by said fraction part detecting means; and an AND circuit for discriminating the floating-point number data as NaN on condition that all the exponent part is discriminated to be '1' by said exponent part condition discriminating means, and all the fraction part is discriminated not to be '0' by said fraction part condition discriminating means.

12. An apparatus for storing a binary floating-point number taking a predetermined data form with a distinction between a numeric value and NaN, said apparatus comprising:

a data form transform circuit for transforming input data corresponding to a data precision into an internal form which does not depend on a precision from the data form;

a NaN detecting circuit, to which the data transformed into the internal form is inputted, for detecting whether the input data is NaN or not;

a register file for storing the data transformed into the internal form together with a detection signal from said NaN detecting circuit; and a data form restoring circuit for inverse-transforming the internal form data read from said register file into the previous data form corresponding to the designated data precision, characterized in that there are outputted the data restored by said data form restoring circuit and a detection signal relative to NaN which corresponds to the data read from said register file.

13. An apparatus for storing a binary floating-point number taking a predetermined data form with a distinction between a numeric value and NaN, said apparatus comprising:

a data form transform circuit for transforming input data corresponding to a data precision into an internal form which does not depend on a precision from the data form;

a register file for storing the data transformed into the internal form;

a NaN detecting circuit, to which the data read from said register file is inputted, for detecting whether the input data is NaN or not; and a data form restoring circuit for inverse-transforming the internal form data read from said register file into the previous data form corresponding to the data precision, characterized in that there are outputted the data restored by said data form restoring circuit and a detection signal from said NaN detecting circuit.

* * * * *

UNITED STATES PATENT AND TRADEMARK OFFICE
CERTIFICATE OF CORRECTION

PATENT NO. : 5,481,489

DATED : January 2, 1996

INVENTOR(S) : Masahiro YANAGIDA et al.

It is certified that error appears in the above-indentified patent and that said Letters Patent is hereby corrected as shown below:

Column 1, lines 41 and 64, change "s" to --$\underline{s}$--;

lines 42 and 65, change "e" to --$\underline{e}$--; and lines 44 and 65, change "f" to --$\underline{f}$--.

Column 2, line 16, change "s" to --$\underline{s}$--;

lines 16, 45, and 47, change "e" to --$\underline{e}$--; and lines 16, 46, and 48, change "f" to --$\underline{f}$--.

Column 3, line 55, change "e" to --$\underline{e}$--.

Column 12, line 8, change "f" to --$\underline{f}$--.

Column 16, lines 12, 25, 27, 31, and 33, change "e" to --$\underline{e}$--; and lines 12, 20, 28, 31, and 35, change "f" to --$\underline{f}$--.

Column 19, lines 15 and 37, change "s" to --$\underline{s}$--;

lines 18, 21, 39, and 42, change "a" to --$\underline{a}$--;

lines 18, 22, 40, and 43, change "b" to --$\underline{b}$--.

UNITED STATES PATENT AND TRADEMARK OFFICE
CERTIFICATE OF CORRECTION

PATENT NO. : 5,481,489

DATED : January 2, 1996

INVENTOR(S) : Masahiro YANAGIDA et al.

It is certified that error appears in the above-indentified patent and that said Letters Patent is hereby corrected as shown below:

Column 24, delete the double spacing.

Signed and Sealed this

Fourteenth Day of May, 1996

Attest:

BRUCE LEHMAN

Attesting Officer

Commissioner of Patents and Trademarks